US011970812B2

United States Patent
Hu et al.

(10) Patent No.: US 11,970,812 B2
(45) Date of Patent: Apr. 30, 2024

(54) DRIVING SYSTEM OF DRUM WASHING MACHINE AND DRUM WASHING MACHINE

(71) Applicants: GUANGDONG WELLING MOTOR MANUFACTURING CO., LTD., Foshan (CN); MIDEA WELLING MOTOR TECHNOLOGY (SHANGHAI) CO., LTD., Shanghai (CN)

(72) Inventors: Yiming Hu, Foshan (CN); Tiantian Yan, Foshan (CN); Ping Li, Foshan (CN); Di Wu, Foshan (CN); Jintao Chen, Foshan (CN)

(73) Assignees: GUANGDONG WELLING MOTOR MANUFACTURING CO., LTD., Guangdong (CN); MIDEA WELLING MOTOR TECHNOLOGY (SHANGHAI) CO., LTD., Shanghai (CN)

(*) Notice: Subject to any disclaimer, the term of this patent is extended or adjusted under 35 U.S.C. 154(b) by 794 days.

(21) Appl. No.: 17/080,288

(22) Filed: Oct. 26, 2020

(65) Prior Publication Data
US 2021/0040672 A1 Feb. 11, 2021

Related U.S. Application Data

(63) Continuation of application No. PCT/CN2018/120128, filed on Dec. 10, 2018.

(30) Foreign Application Priority Data

Apr. 27, 2018 (CN) .......................... 201810393801.7
Apr. 27, 2018 (CN) .......................... 201810395151.X

(51) Int. Cl.
*D06F 37/30* (2020.01)
*D06F 23/02* (2006.01)
(Continued)

(52) U.S. Cl.
CPC ............ *D06F 37/30* (2013.01); *D06F 23/025* (2013.01); *D06F 33/56* (2020.02); *F16D 11/14* (2013.01);
(Continued)

(58) Field of Classification Search
CPC ........ D06F 37/30; D06F 33/56; D06F 23/025; F16D 11/14; F16D 27/108; F16D 27/118;
(Continued)

(56) References Cited

U.S. PATENT DOCUMENTS

2015/0061560 A1\* 3/2015 Lee ........................... H02P 6/17
318/400.38

FOREIGN PATENT DOCUMENTS

CN 202415974 U 9/2012
CN 103321018 A 9/2013
(Continued)

OTHER PUBLICATIONS

International Search Report dated Mar. 15, 2019 received in International Application No. PCT/CN2018/120128 together with an English language translation.
(Continued)

*Primary Examiner* — Tinsae B Ayalew
(74) *Attorney, Agent, or Firm* — Scully, Scott, Murphy & Presser, P.C.

(57) ABSTRACT

A driving system having a hollow shaft, a solid shaft arranged in the hollow shaft, a stator, a rotor connected to the hollow shaft, a clutch mechanism selectively engaged to one of the stator and the rotor, and a speed reduction mechanism having a planetary carrier assembly engaged to the clutch mechanism, and a planetary gear train connected between the solid shaft and the rotor, wherein where the clutch mechanism is engaged to the stator in a transmission manner, the planetary carrier assembly is connected with the
(Continued)

stator, and the rotor drives the solid shaft and the hollow shaft to operate at a differential speed, and where the clutch mechanism is engaged to the rotor in the transmission manner, the planetary carrier assembly is connected with the rotor, and the rotor drives the solid shaft and the hollow shaft to operate at a same speed by the planetary gear train.

20 Claims, 13 Drawing Sheets

(51) Int. Cl.

| | | |
|---|---|---|
| *D06F 33/56* | (2020.01) | |
| *F16D 11/14* | (2006.01) | |
| *F16D 27/108* | (2006.01) | |
| *F16D 27/118* | (2006.01) | |
| *F16D 27/14* | (2006.01) | |
| *F16H 3/46* | (2006.01) | |
| *F16H 57/021* | (2012.01) | |
| *F16H 57/029* | (2012.01) | |
| *F16H 57/08* | (2006.01) | |
| *F16H 63/30* | (2006.01) | |

(52) U.S. Cl.
CPC .......... *F16D 27/108* (2013.01); *F16D 27/118* (2013.01); *F16D 27/14* (2013.01); *F16H 3/46* (2013.01); *F16H 57/021* (2013.01); *F16H 57/029* (2013.01); *F16H 57/082* (2013.01); *F16H 63/30* (2013.01); *F16H 2063/3093* (2013.01); *F16H 2200/0034* (2013.01); *F16H 2200/2064* (2013.01); *F16H 2200/2094* (2013.01)

(58) Field of Classification Search
CPC .......... F16D 27/14; F16H 3/46; F16H 57/021; F16H 57/029; F16H 57/082; F16H 63/30; F16H 2063/3093; F16H 2200/0034; F16H 2200/2064; F16H 2200/2094
USPC ...................................................... 68/12.24
See application file for complete search history.

(56) References Cited

FOREIGN PATENT DOCUMENTS

| | | |
|---|---|---|
| CN | 108360219 A | 8/2018 |
| CN | 108457047 A | 8/2018 |
| CN | 108570808 A | 9/2018 |
| CN | 208183356 U | 12/2018 |
| CN | 208562866 U | 3/2019 |
| JP | 2000-070588 A | 3/2000 |
| KR | 10-2005-0120975 A | 12/2005 |

OTHER PUBLICATIONS

First Office Action dated Apr. 1, 2019 received in Chinese Patent Application No. CN 201810393801.7 together with an English language translation.
First Office Action dated Apr. 1, 2019 received in Chinese Patent Application No. CN 201810395151.X together with an English language translation.
Notification of Reason for Refusal dated Nov. 11, 2021 received in Korean Patent Application No. KR 10-2020-7025243 together with an English langauge translation.

* cited by examiner

DRIVING SYSTEM OF DRUM WASHING MACHINE AND DRUM WASHING MACHINE

CROSS-REFERENCES TO RELATED APPLICATIONS

This application claims priority to Chinese Patent Application No. 201810395151.X, filed with the China National Intellectual Property Administration on Apr. 27, 2018 and Chinese Patent Application No. 201810393801.7, filed with the China National Intellectual Property Administration on Apr. 27, 2018. The entire content of each of Chinese Patent Application No. 201810395151.X and Chinese Patent Application No. 201810393801.7 is incorporated herein by reference.

FIELD

The present application relates to the technical field of household appliances, in particular to a driving system of a drum washing machine and the drum washing machine comprising the same.

BACKGROUND

At present, a drum washing machine can overcome the defects of clothes winding and abrasion caused by a pulsator washing machine, but the washing performed by the drum washing machine requires a longer time, has a lower efficiency, and has a lower cleaning ratio.

In addition, for a dual output drum washing machine, in which the drum and the rotating body can relatively run at different speeds during the washing, the friction force between clothes is increased, and the cleaning ratio is improved. However, in the conventional dual output drum washing machine, a rotor is generally fixed on an input shaft, the input shaft is a slender shaft, and the problems of insufficient rigidity and the like are caused. In addition, the existing dual output drum washing machine also has the problems of more parts, difficult assembly, low axial space utilization rate and the like.

SUMMARY

The present application is directed to solving at least one of the above-mentioned technical problems.

To this end, it is an object of one aspect of the present application to provide a driving system of a drum washing machine.

It is an object of another aspect of the present application to provide a drum washing machine including the driving system of the drum washing machine above-described.

To achieve the above objects, the technical solution of the first aspect of the present application provides a driving system of a drum washing machine, comprising: a hollow shaft, and a solid shaft rotatably arranged in the hollow shaft; a motor comprising a stator and a rotor, wherein the rotor is fixedly connected to one end of the hollow shaft; a clutch mechanism being controlled to be selectively engaged to one of the stator and the rotor in a transmission manner; a speed reduction mechanism comprising a planetary carrier assembly engaged to the clutch mechanism, and a planetary gear train connected between the solid shaft and the rotor in a transmission manner; the clutch mechanism is engaged to the stator in a transmission manner, the planetary carrier assembly is fixedly connected with the stator, and the rotor drives the solid shaft and the hollow shaft to operate at a differential speed by the planetary gear train; or the clutch mechanism is engaged to the rotor in a transmission manner, the planetary carrier assembly is fixedly connected with the rotor, and the rotor drives the solid shaft and the hollow shaft to operate at a same speed by the planetary gear train.

According to the driving system of the drum washing machine provided by the technical solution, the rotor is directly fixedly connected with the hollow shaft and operates at a same speed; when the clutch mechanism enables the planetary carrier assembly to be fixedly connected with the stator, the rotor drives the solid shaft and the hollow shaft to operate at a differential speed by the planetary gear train, achieving a dual output, increasing friction force between clothes, and accordingly improving cleanliness; when the planetary carrier assembly is fixedly connected with the rotor by the clutch mechanism, the rotor drives the solid shaft and the hollow shaft to operate at the same speed by the planetary gear train; compared with the solution that the rotor is fixed on a slender input shaft, the mode that the rotor is directly connected with the hollow shaft shortens the installation span of the rotor, improves the integral rigidity, and does not change the connection relationship between the rotor and the drum shaft of the traditional drum washing machine, which greatly reduces design modification amount and reduces the cost.

In addition, the driving system of the drum washing machine provided in the above-mentioned technical solution of the present application can also have the following additional technical features.

In the above technical solution, optionally, the rotor is fixedly connected to a rear end of the hollow shaft in an opening-backward manner, and the stator is coaxially arranged inside or outside the rotor.

According to the technical solution, optionally, the driving system of the drum washing machine comprises a front cover plate provided with an inner hole, and the hollow shaft is rotatably installed in an inner hole of the front cover plate; and the rear shell is fixedly connected to the rear end face of the front cover plate in an opening-forward manner and hollowly sleeved outside the rotor without contact, and the stator is fixedly connected to a bottom of the rear shell.

The rear shell is fixedly connected to the rear end face of the front cover plate in an opening-forward manner and hollowly sleeved outside the rotor without contact, so that the rotor is positioned inside the rear shell, the whole driving system does not have an external rotating component, and the safety of products is improved; as for the solution that the stator is coaxially arranged inside the rotor, compared with the traditional outer rotor motor assembling, the difference is only that the rotor of the application is reversely installed, with small design modification amount.

In the technical solution, optionally, the rear shell and the front cover plate are fixedly connected to form an internal cavity, and the motor, the speed reduction mechanism and the clutch mechanism are all placed in the internal cavity, so that the driving system is integrated.

Optionally, the front cover plate is an independent component, and the rear shell is also an independent component; the motor, the speed reduction mechanism and the clutch mechanism are all placed in an internal cavity formed by fixedly connecting the rear shell and the front cover plate, so that the whole driving system does not have an external rotating component, and the safety of products is improved; moreover, the whole driving system is formed into a whole, namely the whole driving system is designed in a modularization mode, which is very convenient to supply and install for a complete machine manufacturer.

According to the technical solution, optionally, the front end and the rear end of an inner hole of the front cover plate are respectively provided with a first bearing and a second bearing, and the hollow shaft is rotatably installed in an inner hole of the front cover plate by the first bearing and the second bearing; and the hollow shaft is of a hollow structure, and the solid shaft is rotatably arranged in the hollow shaft by a first bushing and a second bushing which are press-fitted in an inner hole of the hollow shaft.

The first bearing and the second bearing are directly arranged at the front end and the rear end of the front cover plate respectively, namely the front cover plate simultaneously serves as a front bearing seat and a rear bearing seat. That is, the front bearing seat and the rear bearing seat are integrally designed, with improved supporting rigidity.

According to the technical solution, optionally, the front cover plate is an independent component independent of an outer barrel of the drum washing machine, and the driving system comprises: a first oil seal fixedly installed at a front end of the front cover plate, connected inwards with the hollow shaft in a sealing manner, and used for being connected outwards with the outer drum of the drum washing machine in a sealing manner; and a second oil seal fixedly installed in an inner hole at the front end of the hollow shaft and connected inwards with the solid shaft in a sealing manner.

According to the technical solution, optionally, the front cover plate is integrally formed on the outer barrel of the drum washing machine, and the driving system comprises: a first oil seal fixedly installed at the front end of the front cover plate and connected inwards with the hollow shaft in a sealing manner; and a second oil seal fixedly installed in an inner hole at the front end of the hollow shaft and connected with inwards the solid shaft in a sealing manner.

The first oil seal is used for preventing the oil at the first bearing from splashing out from an assembly gap between the front ends of the hollow shaft and the front cover plate, and the second oil seal is used for preventing the oil at the first bushing from splashing out from the assembly gap between the solid shaft and the front end of the hollow shaft.

Optionally, the planetary carrier assembly hollowly sleeves the solid shaft rotatably, the planetary carrier assembly comprises a planetary carrier and a cover plate of the planetary carrier, the cover plate of the planetary carrier is of a cup-shaped structure, the planetary carrier is placed at an inner side of the cup-shaped structure and fixedly connected with the cover plate of the planetary carrier, and the planetary gear train is arranged inside the cover plate of the planetary carrier; and a first spline portion is fixedly arranged on an outer ring of the cover plate of the planetary carrier, and the clutch mechanism is sleeved outside the first spline portion.

The cover plate of the planetary carrier is designed into a cup-shaped structure, an inner side of the cover plate of the planetary carrier is used for installing a planetary gear train, an outer ring of the cover plate of the planetary carrier is fixedly provided with a first spline portion, and the clutch mechanism is sleeved outside the first spline portion, so that the clutch mechanism and the planetary gear train are arranged in the driving system in a nested parallel mode, the axial space is greatly compressed, and the possibility of expanding the washing machine is provided.

According to the technical solution, optionally, the planetary gear train comprises a sun gear, planetary gears and an inner gear ring, the inner gear ring is coaxially and fixedly arranged on the rotor, the sun gear is fixedly arranged on the solid shaft, and one or more groups of the planetary gears are arranged between the sun gear and the inner gear ring in a meshing transmission mode; wherein a planetary gear shaft is arranged between a bottom of an inner side of the cover plate of the planetary carrier and the planetary carrier, the planetary gears hollowly sleeve the planetary gear shaft and is meshed inwards with the sun gear, and the inner gear ring is arranged between the outer ring of the planetary carrier and the inner wall of the cover plate of the planetary carrier and is meshed inwards with the planetary gear.

The sun gear is fixedly connected with the solid shaft, the inner gear ring is fixedly connected with the rotor, one or more groups of planetary gears are arranged between the sun gear and the inner gear ring in a meshing transmission mode, and the rotor drives the solid shaft and the hollow shaft to operate at a differential speed or at a same speed by the inner gear ring, the planetary gears and the sun gear.

In the technical solution, optionally, a third bushing is fixedly arranged in an inner hole of the planetary carrier, a fourth bushing is fixedly arranged in an inner hole of the cover plate of the planetary carrier, the planetary carrier assembly hollowly sleeves the solid shaft rotatably by the third bushing and the fourth bushing, and the sun gear is positioned between the third bushing and the fourth bushing.

The planetary carrier assembly rotatably hollowly sleeves the solid shaft by the third bushing and the fourth bushing, the sun gear is positioned between the third bushing and the fourth bushing, namely the planetary gear train is positioned between the third bushing and the fourth bushing, a double-end support improves connection rigidity of the whole planetary gear train and the planetary carrier assembly to avoid the rigidity deficiency caused by a single-side support, the washing noise can be reduced, and the stability of the whole machine is improved.

According to the technical solution, optionally, a group of the planetary gears are arranged between the sun gear and the inner gear ring, and the planetary gears are meshed outwards with the inner gear ring and meshed inwards with the sun gear, so that the inner gear ring and the sun gear output in a reverse direction; or two groups of the planetary gears meshed with each other are arranged between the sun gear and the inner gear ring, the planetary gears positioned on an outer side are meshed outwards with the inner gear ring, and the planetary gears positioned on an inner side are meshed inwards with the sun gear, so that the inner gear ring and the sun gear output in a same direction.

A group of the planetary gears are arranged between the sun gear and the inner gear ring, so that the reverse output of the inner gear ring and the sun gear can be realized by the design to reversely rotate the hollow shaft fixedly connected with the inner gear ring and the solid shaft fixedly connected with the sun gear, the friction force between clothes is increased, and the cleanliness is further improved; of course, two groups of the planetary gears can be arranged between the sun gear and the inner gear ring to realize the same-direction output of the inner gear ring and the sun gear, so that the hollow shaft fixedly connected with the inner gear ring and the solid shaft fixedly connected with the sun gear rotate in the same direction to improve rotation stability of the hollow shaft and the solid shaft.

According to the technical solution, optionally, the clutch mechanism comprises a clutch sliding sleeve, a second spline portion is fixedly arranged on an inner hole of the clutch sliding sleeve, and the clutch sliding sleeve is axially and slidably sleeved outside the first spline portion by the second spline portion; and two ends of the clutch sliding sleeve are respectively provided with first dewatering clutch teeth and first washing clutch teeth, the inner gear ring is fixedly provided with second dewatering clutch teeth, the stator is fixedly connected with second washing clutch teeth, and the clutch sliding sleeve can be controlled to slide towards one of the second dewatering clutch teeth and the second washing clutch teeth.

Specifically, when the first washing clutch gear on the clutch sliding sleeve is meshed with the second washing clutch gear fixedly connected with the stator, the clutch sliding sleeve enables the planetary carrier assembly to be fixedly connected with the stator, and the planetary carrier assembly is braked; at the moment, the planetary gear can only rotate on its axis and cannot rotate around the sun gear, and the rotor drives the inner gear ring to rotate on its axis to drive the planetary gear to rotate, so that the sun gear is driven to rotate; the sun gear and the inner gear ring are in equal-ratio differential operation, so that the sun gear and the inner gear ring respectively drive the drum and the rotating body to perform differential operation by the hollow shaft and the solid shaft, and dual output is realized; when the first dewatering clutch gear on the clutch sliding sleeve is meshed with the second dewatering clutch gear fixedly connected with the inner gear ring, the clutch sliding sleeve enables the planetary carrier assembly to be fixedly connected with the inner gear ring, the rotor drives the inner gear ring to rotate, the planetary carrier assembly rotates along with the inner gear ring; and at the moment, the whole planetary gear train operates at the same speed, so that the rotating body driven by the solid shaft and the drum driven by the hollow shaft operate at the same speed.

In the technical solution, optionally, the clutch mechanism further comprises an electromagnetic coil assembly and a clutch spring, the clutch sliding sleeve comprises a non-magnetic conductive tooth-shaped piece and a magnetic conductive sleeve sleeved on the non-magnetic conductive tooth-shaped piece, and the clutch sliding sleeve can switchably slide between a dewatering station and a washing station under the action of an electromagnetic force of the electromagnetic coil assembly and an elastic force of the clutch spring.

The electromagnetic coil assembly and the clutch spring jointly act to realize a switchable sliding of the clutch sliding sleeve between the dewatering station and the washing station, with a simple structure and accurate action control; specifically, the dewatering station is a position where the first dewatering clutch teeth and the second dewatering clutch teeth are meshed, and the washing station is a position where the first washing clutch teeth and the second washing clutch teeth are meshed.

According to the technical solution, optionally, the driving system comprises a front cover plate and a rear shell, the rear shell is fixedly connected to the rear end face of the front cover plate in an opening-forward manner and hollowly sleeved outside the rotor without contact, the stator is fixedly connected to a bottom of an inner side of the rear shell and is coaxially arranged inside the rotor, and the second washing clutch teeth is fixed to a bottom of an inner side of the rear shell; and the electromagnetic coil assembly is fixedly connected with the rear shell and coaxially arranged inside the stator, and the electromagnetic coil assembly is sleeved outside the clutch sliding sleeve.

The electromagnetic coil assembly is coaxially arranged inside the stator, and the electromagnetic coil assembly is sleeved outside the clutch sliding sleeve. According to the nested design of the electromagnetic coil assembly and the clutch sliding sleeve, the axial dimension is reduced, and the axial space is compressed; the motor adopts an outer rotor motor, the opening of the rotor is arranged backwards, the stator is coaxially arranged inside the rotor, the rotor, the stator, the electromagnetic coil assembly, the clutch sliding sleeve, the planetary carrier assembly and the planetary gear train are sequentially nested from outside to inside in a radial direction, the whole structure is arranged in parallel, and the utilization rate of the axial dimension is greatly improved.

In the technical solution, optionally, the clutch sliding sleeve is provided with a spring mounting portion with a backward opening, and the clutch spring is arranged between the spring mounting portion and the rear shell, so that the clutch sliding sleeve slides towards the second washing clutch teeth when the electromagnetic coil assembly is powered on, and the clutch sliding sleeve slides towards the second dewatering clutch teeth when the electromagnetic coil assembly is powered off.

The clutch spring is arranged between the spring mounting portion and the rear shell; when the drum washing machine is in a non-working state, the clutch sliding sleeve is positioned at the dewatering station, and the first dewatering clutch teeth and the second dewatering clutch teeth are in a meshing state; during washing, the electromagnetic coil assembly is powered on, the magnetic conductive sleeve moves backwards under the action of electromagnetic force and compresses the clutch spring; at the moment, the first washing clutch teeth and the second washing clutch teeth are meshed, the planetary carrier assembly is braked, the planetary gear train is converted into a fixed-shaft gear train, and the sun gear and the inner gear ring output in an equal speed ratio; during dewatering, the electromagnetic coil assembly is powered off, the clutch sliding sleeve is reset under the action of the clutch spring, the washing clutch teeth are not meshed, and the first dewatering clutch teeth and the second dewatering clutch teeth are meshed; at the moment, the planetary carrier assembly is fixedly connected with the inner gear ring, and the whole planetary gear train operates at the same speed; and according to the solution that the electromagnetic coil assembly is powered on in the washing mode and the electromagnetic coil assembly is powered off in the dewatering mode, the clutch teeth cannot be damaged during the dewatering and power failure, and the reliability of the clutch mechanism is improved.

In the technical solution, optionally, the clutch sliding sleeve is provided with a spring mounting portion with a frontward opening, and the clutch spring is arranged between the spring mounting portion and the rotor, so that the clutch sliding sleeve slides towards the second dewatering clutch teeth when the electromagnetic coil assembly is powered on, and the clutch sliding sleeve slides towards the second washing clutch teeth when the electromagnetic coil assembly is powered off.

A clutch spring is arranged between the spring mounting portion and the rotor. When the washing machine is in a non-working state, the clutch sliding sleeve is positioned at the washing station, and the first washing clutch teeth and the second washing clutch teeth are in a meshing state. During washing, the electromagnetic coil assembly is powered off, the clutch sliding sleeve is reset under the action of the clutch spring; at the moment, the first washing clutch teeth and the second washing clutch teeth are meshed, the planetary carrier assembly is braked, the planetary gear train is converted into a fixed shaft gear train, and the sun gear and the inner gear ring output in a reverse equal speed ratio; during dewatering, the electromagnetic coil assembly is powered on, the magnetic conductive sleeve moves forwards under the action of electromagnetic force and compresses the clutch spring, the washing clutch teeth are not meshed, the first dewatering clutch teeth and the second dewatering clutch teeth are meshed; at the moment, the planetary carrier assembly is fixedly connected with the inner gear ring, and the whole planetary gear train operates at the same speed. According to the solution that the electromagnetic coil assembly is powered on in the dewatering state, and the electromagnetic coil assembly is powered off in the washing state, the general washing time is far longer than the dewatering time, so that the clutch mechanism does not need a driving force during the washing, has the advantages of saving electricity, reducing energy consumption and improving efficiency.

In the above technical solution, optionally, an inner hole is formed in one side of the rear shell facing the front cover plate, a fifth bushing is press-fitted in an inner hole of the rear shell, and the planetary carrier assembly is pivotally installed in an inner hole of the fifth bushing.

The planetary carrier assembly is pivotally installed in the inner hole of the fifth bushing, so that the planetary carrier assembly is rotatably installed on the rear shell to realize differential operation or same-speed operation of the solid shaft and the hollow shaft according to whether the planetary carrier assembly is braked.

The technical solution of a second aspect of the present application provides a drum washing machine, comprising: an outer barrel, a drum positioned inside the outer barrel and a rotating body arranged at a bottom of the drum; and a driving system of the drum washing machine as described in any of the above technical solutions, wherein the driving system is fixedly connected to a rear end face of the outer barrel, the hollow shaft and the solid shaft of the driving system extend into the drum through the opening at a bottom of the outer barrel, the hollow shaft is fixedly connected with the drum, and the solid shaft is fixedly connected with the rotating body.

According to the technical solution, optionally, the driving system comprises a front cover plate and a rear shell, the front cover plate and the rear shell are independent components independent of the outer barrel, and the three are fixedly connected through by fasteners; or the driving system comprises a front cover plate and a rear shell, wherein the front cover plate is integrally formed on the outer barrel, and the rear shell is fixedly connected with the front cover plate by a fastener.

According to the technical solution, optionally, the drum washing machine comprises a controller electrically connected with the clutch mechanism and used for controlling the clutch mechanism to be engaged with one of the stator and the rotor in a transmission manner in a washing stage according to an acquired washing mode instruction.

The controller controls the clutch mechanism to be engaged with one of the stator and the rotor in a transmission manner in the washing stage according to an acquired washing mode instruction, that is, controls whether the clutch mechanism switches a dewatering station and a washing station so as to control whether the rotating body and the drum are in a differential operating state, thereby achieving the purpose of switching a single-output washing mode or a dual-output washing mode; therefore, when clothes such as silk or wool are washed, it avoids accelerated wear of the clothes, and the rotating body and the drum can be controlled to operate at the same speed during the washing; and when wear-resistant clothes such as jeans and the like are washed, differential operation of the rotating body and the drum during washing can be controlled, so that friction force between the clothes is increased, and washing cleanliness is improved.

The driving system of the drum washing machine and the drum washing machine provided by the technical solution of the application have the following positive effects. According to the application, the first bearing and the second bearing are directly arranged at the front end and the rear end of the front cover plate respectively, namely the front cover plate simultaneously serves as a front bearing seat and a rear bearing seat. That is, the front bearing seat and the rear bearing seat are integrally designed, with improved supporting rigidity; the rotor is directly connected with the hollow shaft, so that the installation span of the rotor is shortened, and the integral rigidity is improved; the number of parts is small, the assembly process is simple, the speed reduction mechanism and the clutch mechanism are arranged in the stator in parallel, and the rotor, the stator, the electromagnetic coil assembly, the clutch sliding sleeve and the planetary gear train of the driving system are optionally nested in sequence from outside to inside in the radial direction, so that the utilization rate of the axial dimension is greatly improved, providing the possibility of capacity expansion and cost reduction of the washing machine; according to the solution that the electromagnetic coil assembly is powered off in the dewatering mode, the clutch teeth cannot be damaged when it is powered off during dewatering, and the reliability of the clutch mechanism is improved; according to the solution the electromagnetic coil assembly is powered on in the dewatering state, the energy consumption can be reduced, and the efficiency can be improved; the modular design of the whole driving clutch is very convenient for a whole machine manufacturer to supply and install; and the dual-output washing mode and the single-output washing mode can be switched and are suitable for washing clothes made of different materials.

Additional aspects and advantages of the application will be apparent from the description which follows, or may be learned by practice of the present application.

BRIEF DESCRIPTION OF THE DRAWINGS

The foregoing and/or additional aspects and advantages of the present application will be apparent from and elucidated hereinafter with reference to the embodiments described in combination with the accompanying drawings, in which.

Figure 1:
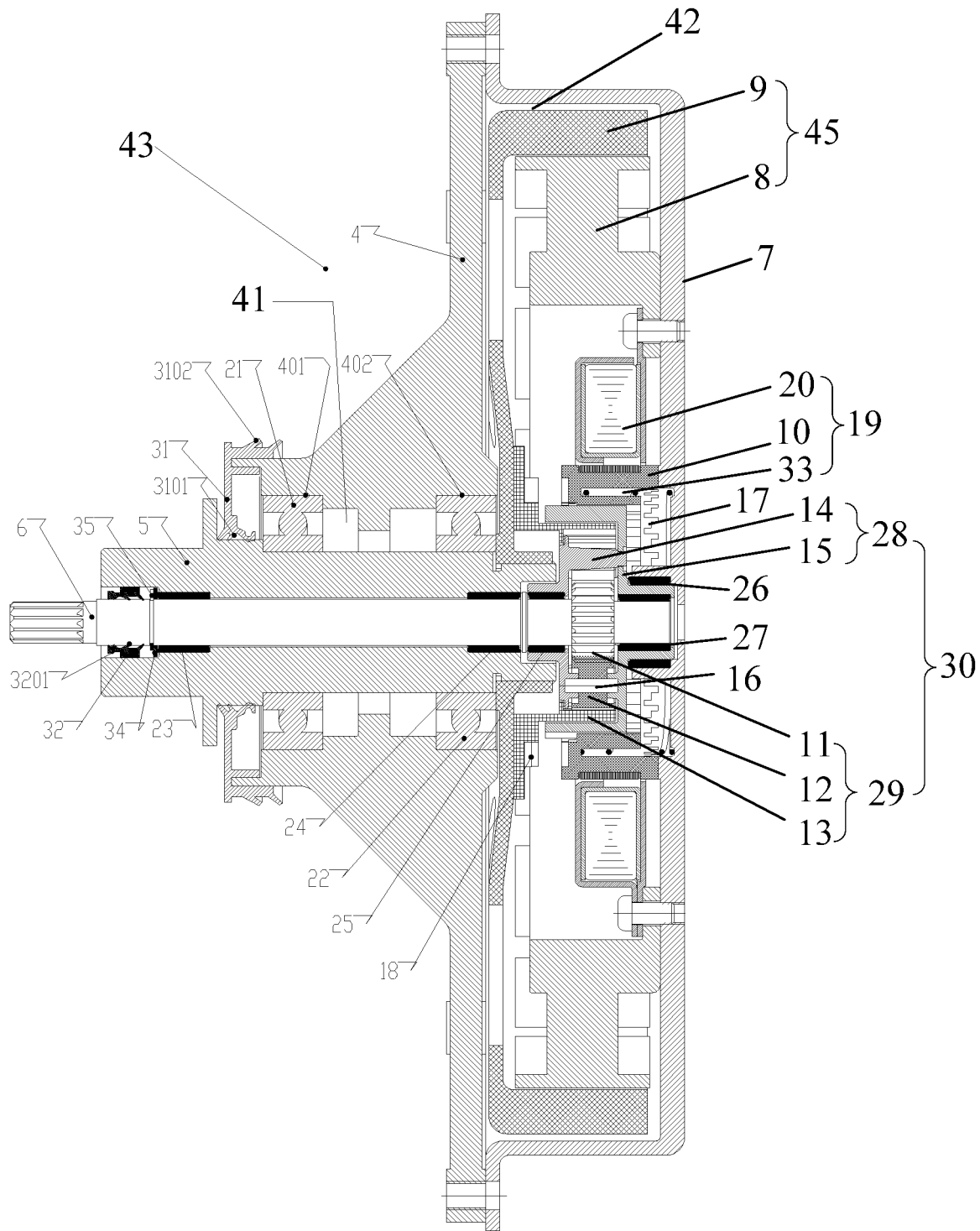
FIG. 1 is a cross-sectional structural schematic view of a driving system of a drum washing machine according to an embodiment of the present application.

The corresponding relationship between the reference signs and component names in FIG. 1 to FIG. 20 is as follows:

1 outer barrel, 2 drum, 3 rotating body, 4 front cover plate, 5 hollow shaft, 6 solid shaft, 7 rear shell, 8 stator, 9 rotor, 10 clutch sliding sleeve, 11 sun gear, 12 planetary gears, 13 inner gear ring, 14 planetary carrier, 15 planetary carrier cover plate, 16 planetary gear shaft, 17 second washing clutch teeth, 18 second dewatering clutch teeth, 19 clutch mechanism, 20 electromagnetic coil assembly, 21 first bearing, 22 second bearing, 23 first bushing, 24 second bushing, 25 third bushing, 26 fourth bushing, 27 fifth bushing, 28 planetary carrier assembly, 29 planetary gear train, 30 speed reduction mechanism, 31 first oil seal, 32 second oil seal, 33 clutch spring, 34 adjusting washer, 35 elastic retaining ring, 41 inner hole of the front cover plate, 42 internal cavity, 43 driving system, 44 controller, 45 motor, 51 inner hole of the hollow shaft, 101 inner hole of the clutch sliding sleeve, 151 inner hole of the cover plate of the planetary carrier, 401 first bearing chamber, 402 second bearing chamber, 501 drum connecting portion, 502 first oil seal connecting portion, 503 bearing mounting portion, 504 rotor connecting portion, 505 second oil seal mounting portion, 506 first bushing mounting portion, 507 second bushing mounting portion, 508 planetary carrier avoidance portion, 601 rotating body connecting portion, 602 second oil seal mounting portion, 603 bushing mounting portion, 604 first shaft shoulder, 605 second shaft shoulder, 1001 non-magnetic conductive tooth-shaped piece, 1002 magnetic conductive sleeve, 1003 second spline portion, 1004 first dewatering clutch teeth, 1005 first washing clutch teeth, 1006 spring mounting portion, 1302 flange plate, 1303 first straight teeth, 1304 second straight teeth, 1306 second oil retaining portion, 1401 planetary carrier body, 1402 first mounting hole, 1403 support column, 1404 boss, 1405 third bushing mounting portion, 1406 first oil retaining portion, 1501 cover plate body, 1502 second mounting hole, 1503 support column through hole, 1504 first spline portion, 1505 fourth bush mounting portion, 1506 annular protrusion, 3101 first sealing lip, and 3102 second sealing lip.

Wherein, the controller 44 may be configured separately, or it may be configured integrally with the controller of the washing machine, for example, the controller 44 may be fixedly connected with the outer barrel 1, and electronically connected with the motor 45.

DETAILED DESCRIPTION

In order that the above objects, features and advantages of the present application may be more clearly understood, the present application will be described in further detail with reference to the accompanying drawings and detailed description. It should be noted that features in the embodiments of the present application may be combined with one another without conflict.

A driving system 43 of a drum washing machine and the drum washing machine according to some embodiments of the present application will be described with reference to FIGS. 1 to 20.

As shown in FIGS. 1 to 20, according to some embodiments of the present application, a driving system of a drum washing machine is provided, comprising: a hollow shaft 5, a solid shaft 6, a motor 45, a clutch mechanism 19 and a speed reduction mechanism 30.

Specifically, as shown in FIGS. 1, 3, 11 and 13, the solid shaft 6 is rotatably arranged in the hollow shaft 5; the motor 45 comprises a stator 8 and a rotor 9, and the rotor 9 is fixedly connected to one end of the hollow shaft 5; the clutch mechanism 19 is controlled to be selectively engaged to one of the stator 8 and the rotor 9 in a transmission manner; and the speed reduction mechanism 30 comprises a planetary carrier assembly 28 engaged to the clutch mechanism 19, and a planetary gear train 29 connected between the solid shaft 6 and the rotor 9 in a transmission manner. With regard to the clutch mechanism 19, the clutch mechanism 19 is engaged to the stator 8 in a transmission manner, the planetary carrier assembly 28 is fixedly connected to the stator 8, and the rotor 9 drives the solid shaft 6 and the hollow shaft 5 to operate at a differential speed by the planetary gear train 29; alternatively, the clutch mechanism 19 is engaged to the rotor 9 in a transmission manner, the planetary carrier assembly 28 is fixedly connected to the rotor 9, and the rotor 9 drives the solid shaft 6 and the hollow shaft 5 to operate at a same speed by the planetary gear train 29.

According to the driving system 43 of the drum washing machine provided by the embodiment of the application, the rotor 9 is directly fixedly connected with the hollow shaft 5 and operates at the same speed; when the clutch mechanism 19 enables the planetary carrier assembly 28 to be fixedly connected with the stator 8, the rotor 9 drives the solid shaft 6 and the hollow shaft 5 to operate at the differential speed by the planetary gear train 29, achieving a dual output, increasing friction force between clothes, and accordingly improving cleanliness; when the planetary carrier assembly 28 is fixedly connected with the rotor 9 by the clutch mechanism 19, the rotor 9 drives the solid shaft 6 and the hollow shaft 5 to operate at the same speed by the planetary gear train 29; compared with the solution that the rotor 9 is fixed on a slender input shaft, the mode that the rotor 9 is directly connected with the hollow shaft 5 shortens the installation span of the rotor 9, improves the integral rigidity, and does not change the connection relationship between the rotor and the drum shaft of the traditional drum washing machine, which greatly reduces the design modification amount and reduces the cost.

Embodiment 1

Figure 2:
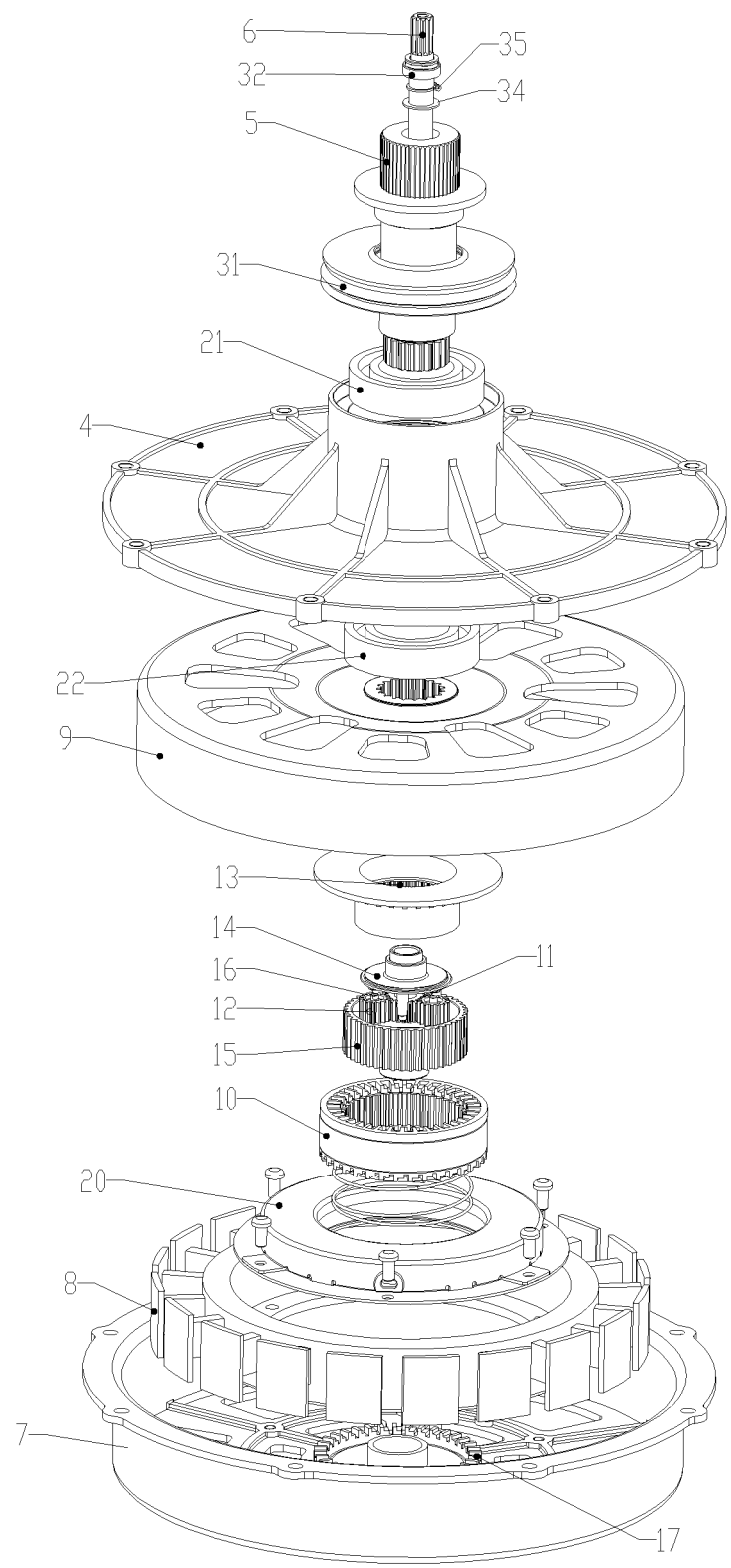
FIG. 2 is an exploded structural schematic view of the driving system of the drum washing machine shown in FIG. 1.
Figure 3:
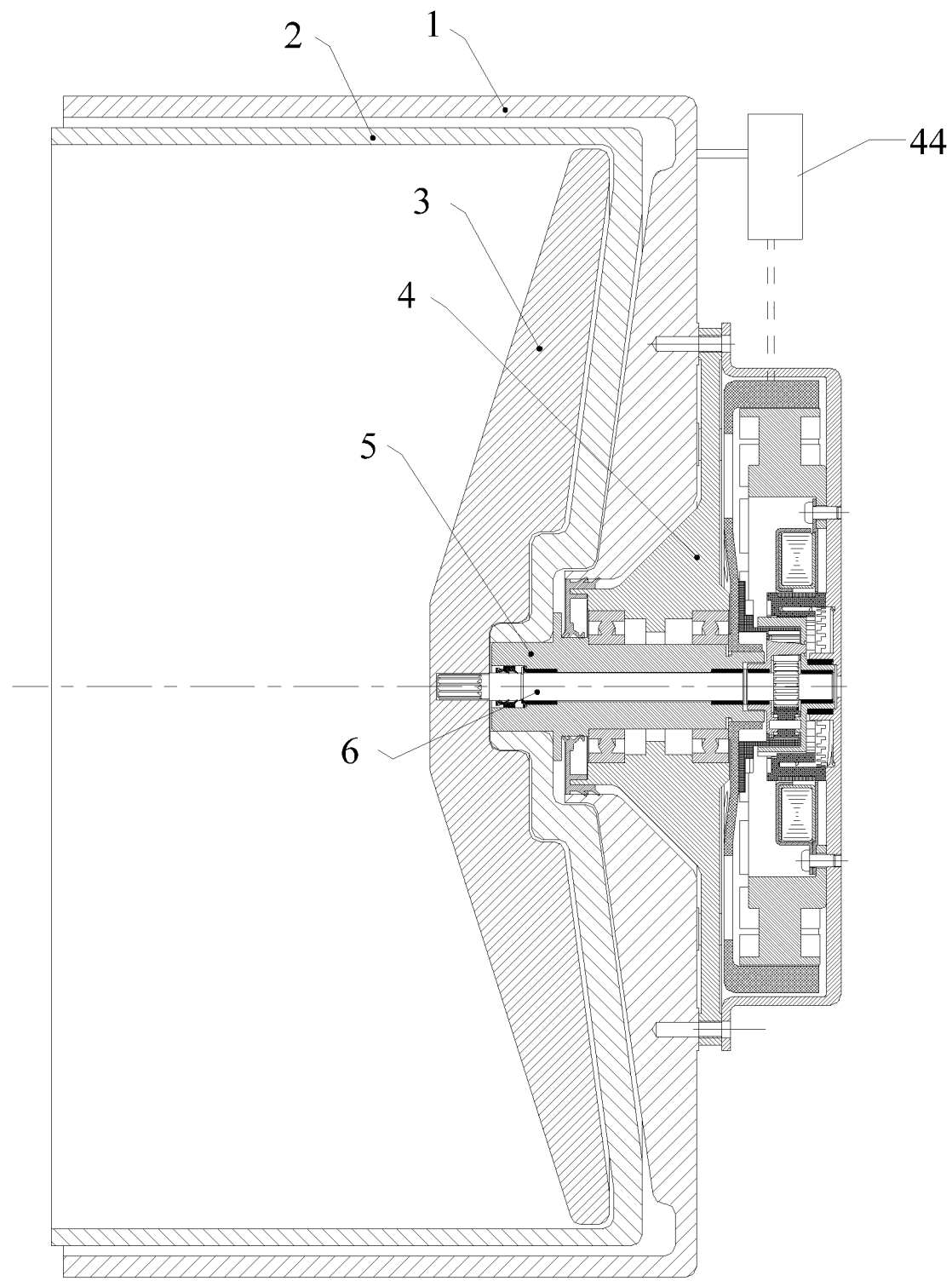
FIG. 3 is a structural schematic view showing a partial cross-sectional structure of a drum washing machine according to an embodiment of the present application.

As shown in FIGS. 1, 2 and 3, the driving system 43 of the drum washing machine comprises a mounting component, a transmission mechanism, a motor, a speed reduction mechanism 30, a clutch mechanism 19 and a seal.

The mounting component comprises a front cover plate 4 and a rear shell 7, the front end and the rear end of an inner hole of the front cover plate 4 are respectively provided with a first bearing chamber 401 and a second bearing chamber 402, and outer rings of a first bearing 21 and a second bearing 22 are respectively fixedly installed in the first bearing chamber 401 and the second bearing chamber 402; and the rear shell 7 is fixedly connected to a rear end face of the front cover plate 4 in an opening-forward manner, with an internal cavity formed inside the both and used for accommodating other components, and no rotating component is arranged outside the whole driving system.

As shown in FIGS. 1 and 3, the front cover plate 4 and the rear shell 7 are both independent components independent of the outer barrel 1 of the drum washing machine, that is, the front cover plate 4 and the rear shell 7 are separately machined and then connected with the outer barrel 1 of the drum washing machine; and optionally, the three are fixedly connected by fasteners such as screws. Of course, other connections are possible.

The transmission component comprises a hollow shaft 5 and a solid shaft 6, and the hollow shaft 5 is rotatably installed in an inner hole of the front cover plate 4 by a first bearing 21 and a second bearing 22; the hollow shaft 5 is of a hollow structure, and the solid shaft 6 is rotatably arranged in the hollow shaft 5 by a first bushing 23 and a second bushing 24 which are press-fitted in an inner hole of the hollow shaft 5; a drum connecting portion 501 is arranged at the front end of the hollow shaft 5 and used for transmitting power to the drum 2; and the front end of the solid shaft 6 is provided with a rotating body connecting portion 601 for transmitting power to the rotating body 3.

The motor comprises a stator 8 and a rotor 9. Optionally, the rotor 9 is fixedly connected to a rear end part of a hollow shaft 5 in an opening-backward manner, and the stator 8 is fixedly connected to a bottom of the rear shell 7 and coaxially arranged inside the rotor 9; and the entire motor is arranged in the internal cavity formed by the rear shell 7 and the front cover plate 4.

It should be noted that the above definition of the orientation of the front cover plate 4, the rear shell 7, the rotor 9, etc., with respect to the installation position of the entire driving system on the drum washing machine, is merely intended to illustrate the assembly positional relationship between the components and is not intended to limit the specific construction of the driving system.

The speed reduction mechanism 30 comprises a planetary carrier assembly 28 and a planetary gear train 29, wherein the planetary carrier assembly 28 comprises a planetary carrier 14 and a planetary carrier cover plate 15, the planetary gear train 29 comprises a sun gear 11, a plurality of planetary gears 12 and an inner gear ring 13, a plurality of planetary gear shafts 16 are circumferentially distributed between the planetary carrier 14 and the cover plate 15 of the planetary carrier, the planetary gears 12 hollowly sleeve the planetary gear shafts 16, and the planetary gears 12 are in one or more groups, with an outermost planetary gear 12 meshed outwards with the inner gear ring 13, and an innermost planetary gear 12 meshed with the sun gear 11; the planetary carrier 14 and the cover plate 15 of the planetary carrier are fixedly connected to form a planetary carrier assembly 28, an inner hole of the planetary carrier 14 and an inner hole of the cover plate 15 of the planetary carrier are fixedly provided with a third bushing 25 and a fourth bushing 26 respectively, and the third bushing 25 and the fourth bushing 26 rotatably hollowly sleeve the solid shaft 6; the solid shaft 6 is fixedly connected with a sun gear 11 positioned between the third bushing 25 and the fourth bushing 26 and being meshed outwards with the planetary gear 12 in a transmission manner; and the inner gear ring 13 is coaxially and fixedly arranged on the rotor 9, the cover plate 15 of the planetary carrier is of a cup-shaped structure, the planetary carrier 14 is arranged on an inner side of the cup-shaped structure, and the inner gear ring 13 is arranged between the outer ring of the planetary carrier 14 and the inner wall of the cover plate 15 of the planetary carrier and is meshed inwards with the planetary gear 12.

Optionally, as shown in FIG. 2, the planetary gears 12 are in a group (a group of the planetary gears 12 may include a plurality of the planetary gears 12 with central axes located on the same circle), that is, a group of the planetary gears 12 are provided between the sun gear 11 and the inner gear ring 13, and the planetary gears 12 are meshed outwards with the inner gear ring 13 and are meshed inwards with the sun gear 11, so that the inner gear ring 13 and the sun gear 11 output in a reverse direction. That is, the solid shaft 6 and the hollow shaft 5 achieve reverse differential operation, which means the rotating body 3 and the drum 2 implement reverse differential operation.

Optionally, two groups of mutually meshed planetary gears 12 are arranged between the sun gear 11 and the inner gear ring 13, the planetary gears 12 located on an outer side are meshed outwards with the inner gear ring 13, and the planetary gears 12 located on an inner side are meshed inwards with the sun gear 11, so that the inner gear ring 13 and the sun gear 11 output in the same direction. That is, the solid shaft 6 and the hollow shaft 5 achieve the same-direction differential operation, which means that the rotating body 3 and the drum 2 implement same-direction differential operation.

The clutch mechanism 19 comprises a clutch sliding sleeve 10, an electromagnetic coil assembly 20 and a clutch spring 33. The electromagnetic coil assembly 20 is coaxially and fixedly connected with the rear shell 7; the clutch sliding sleeve 10 comprises a non-magnetic conductive tooth-shaped piece 1001 and a magnetic conductive sleeve 1002, wherein the non-magnetic conductive tooth-shaped piece 1001 and the magnetic conductive sleeve 1002 are matched in diameter and integrally formed; the outer ring of the cover plate 15 of the planetary carrier is fixedly provided with a first spline portion 1504, and the clutch sliding sleeve 10 is axially and slidably sleeved outside the first spline portion 1504 by a second spline portion 1003 fixedly arranged on an inner hole; the two ends of the clutch sliding sleeve 10 are respectively provided with first dewatering clutch teeth 1004 and first washing clutch teeth 1005, the inner gear ring 13 is fixedly provided with second dewatering clutch teeth 18, and the rear shell 7 is fixedly provided with second washing clutch teeth 17; and a spring mounting portion 1006 is provided on the clutch sliding sleeve 10.

The seal comprises a first oil seal 31 and a second oil seal 32, the first oil seal 31 is fixedly arranged at the front end of the front cover plate 4, and is connected inwards with the hollow shaft 5 in a sealing manner and outwards with the outer barrel 1 in a sealing manner; and the second oil seal 32 is fixedly arranged in an inner hole at the front end of the hollow shaft 5 and is connected inwards with the solid shaft 6 in a sealing manner.

Figure 4:
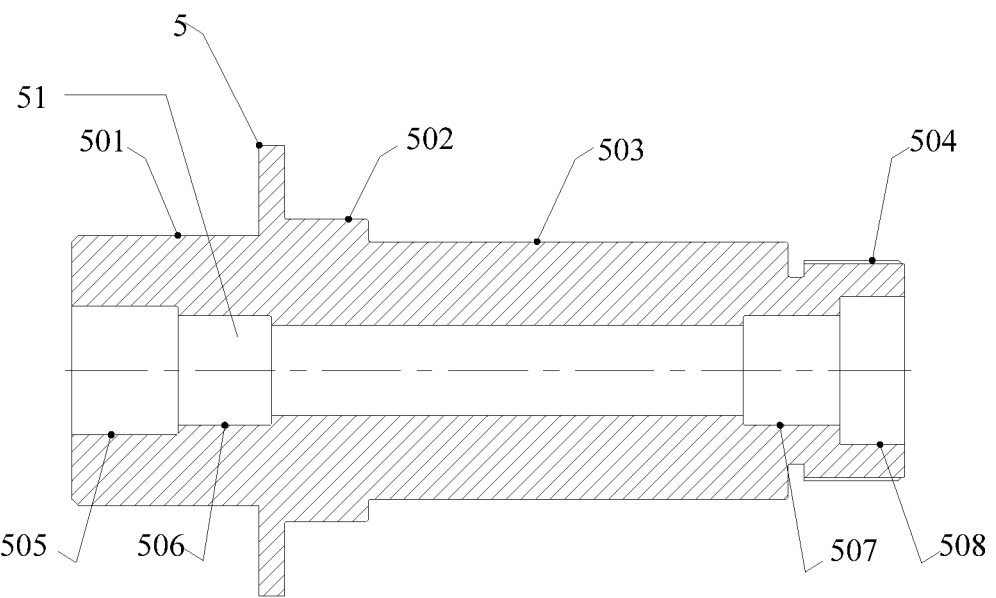
FIG. 4 is a structural schematic view of a hollow shaft of FIG. 1.

Specifically, as shown in FIG. 4, the hollow shaft 5 is of a hollow rotary structure, and a drum connecting portion 501, a first oil seal connecting portion 502, a bearing mounting portion 503 and a rotor connecting portion 504 are sequentially arranged outside the hollow shaft 5 from front to rear; an inner hole is sequentially provided with a second oil seal mounting portion 505, a first bushing mounting portion 506, a second bushing mounting portion 507 and a planetary carrier avoidance portion 508 from front to rear; during the assembling, the hollow shaft 5 is assembled into a bearing hole from the end of the first bearing 21, and the bearing mounting portion 503 is installed in inner holes of the first bearing 21 and the second bearing 22 so as to be pivotally installed inside the front cover plate 4; and the front end of the hollow shaft 5 is fixedly connected with the drum 2 by the drum connecting portion 501, and the rear end is fixedly connected with the rotor 9 by the rotor connecting portion 504 extending out of the bearing hole.

Figure 5:
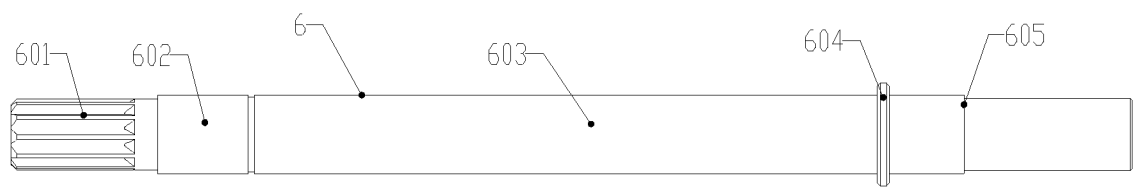
FIG. 5 is a structural schematic view of a solid shaft of FIG. 1.

Specifically, as shown in FIG. 5, the solid shaft 6 is sequentially provided with a rotating body connecting portion 601, a second oil seal connecting portion 602, a bushing mounting portion 603, a first shaft shoulder 604 and a second shaft shoulder 605 from front to rear, the solid shaft 6 is rotatably supported in an inner hole of the hollow shaft 5 by the first bushing 23 and the second bushing 24, and the solid shaft 6 is forwardly confined to the second bushing 24 by the first shaft shoulder 604; one side of the solid shaft 6 which penetrates out of the first bushing 23 is provided with an adjusting washer 34 for adjusting axial movement between the solid shaft 6 and the hollow shaft 5, and the adjusting washer 34 is confined backwards to the first bushing 23 by an elastic retaining ring 35 arranged at a front end of the adjusting washer 34; and the front end of the solid shaft 6 is fixedly connected with the rotating body 3 by the rotating body connecting portion 601, and the rear end of the solid shaft 6 is fixedly connected with the sun gear 11 and confined to the second shaft shoulder 605.

Alternatively, the solid shaft 6 and the sun gear 11 may be integrally machined as a gear shaft.

Further, as shown in FIGS. 1, 3 and 4, the rotor 9 is fixedly connected at the rotor connecting portion 504 in an opening-backward manner and axially positioned on an inner ring end face of the second bearing 22; an inner gear ring 13 and a second dewatering clutch gear 18 are coaxially and fixedly connected to a bottom of an inner side of the rotor, and alternatively, the inner gear ring 13 and the second dewatering clutch gear 18 can be integrally molded on the rotor 9 or fixedly connected by assembling; the stator 8 is fixed at a bottom of the rear shell 7 by threaded connection, is coaxially arranged in the rotor 9, and the whole motor is arranged in a cavity formed by the rear shell 7 and the front cover plate 4; and the structure can improve the connection rigidity of the rotor 9 and the support rigidity of the whole system.

Figure 7:
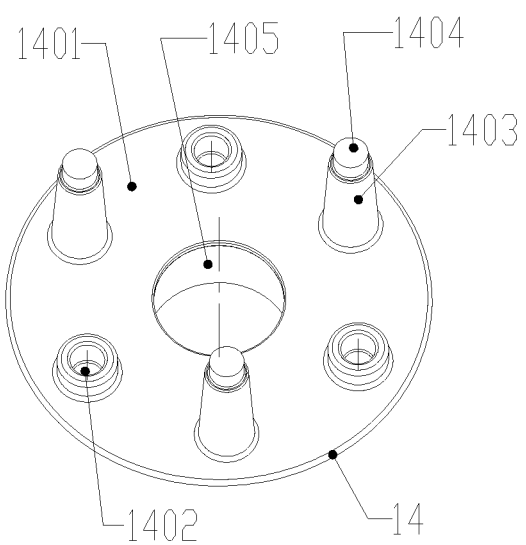
FIG. 7 is a structural schematic view of a planetary carrier of FIG. 1.

Further, as shown in FIGS. 1 and 3, the planetary carrier 14 and the cover plate 15 of the planetary carrier are of a hollow structure, with inner holes of the planetary carrier 14 and the cover plate 15 of the planetary carrier fixedly provided with a third bushing 25 and a fourth bushing 26 respectively, and rotatably hollowly sleeve the solid shaft 6 by the bushing, and the sun gear 11 is arranged between the third bushing and the fourth bushing; as shown in FIGS. 1 and 7, the third bushing mounting portion 1405 integrally arranged on the planetary carrier 14 is inserted into the planetary carrier avoidance portion 508 of the hollow shaft 5 and axially confined on the first shaft shoulder 604; double-end support improves connection rigidity of the whole planetary gear train 29, avoids insufficient rigidity caused by single-side support, reduces washing noise and improves the stability of the whole planetary gear train 29; meanwhile, the arrangement of the planetary carrier avoidance portion compresses the axial dimension.

Figure 8:
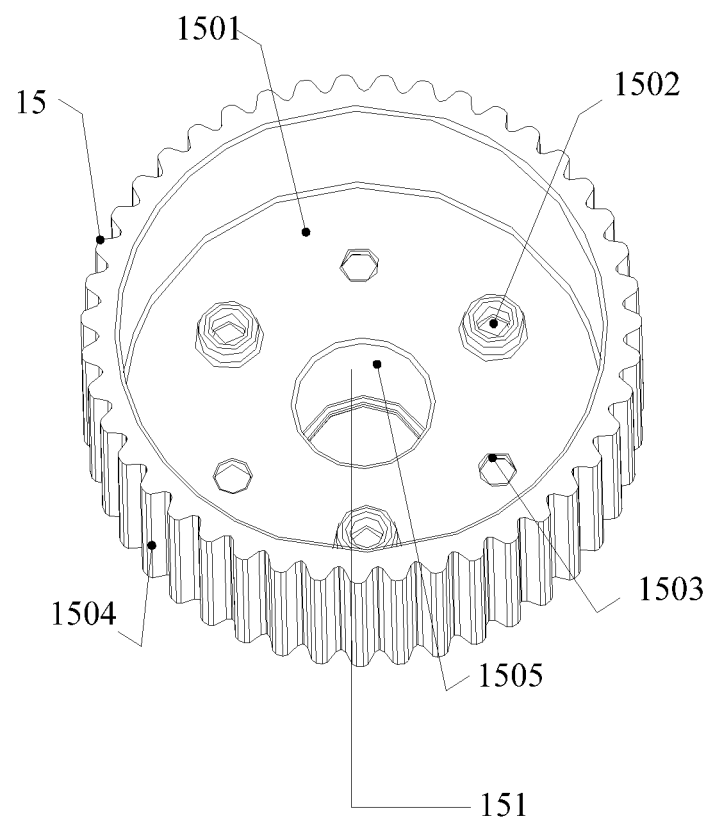
FIG. 8 is a structural schematic view of a cover plate of the planetary carrier of FIG. 1.

Further, as shown in FIGS. 2, 3 and 8, the planetary carrier 14 and the cover plate 15 of the planetary carrier are fixedly connected as a planetary carrier assembly 28. Specifically, an inner side of a planetary carrier body 1401 is provided with a support column 1403, an end of the support column 1403 is provided with a boss 1404, the cover plate body 1501 is provided with a support column through hole 1503, the support column 1403 is inserted into the support column through hole 1503, and the boss 1404 is spin riveted, so that the planetary carrier 14 and the cover plate 15 of the planetary carrier are fixedly connected; a plurality of first mounting holes 1402 and second mounting holes 1502 are respectively and circumferentially distributed between the both, the first mounting holes 1402 and the second mounting holes 1502 are correspondingly arranged, a plurality of planetary gear shafts 16 are installed in the first mounting holes 1402 and the second mounting holes 1502, the planetary gears 12 hollowly sleeve the planetary gear shafts 16 and are meshed inwards with the sun gear 11 in a transmission manner; and the cover plate 15 of the planetary carrier is of a cup-shaped structure, the planetary carrier 14 is positioned inside the cup-shaped structure, and the inner gear ring 13 is coaxially arranged between the outer ring of the planetary carrier 14 and the inner wall of the cover plate 15 of the planetary carrier, and is meshed inwards with the planetary gear 12 in a transmission manner.

Figure 9:
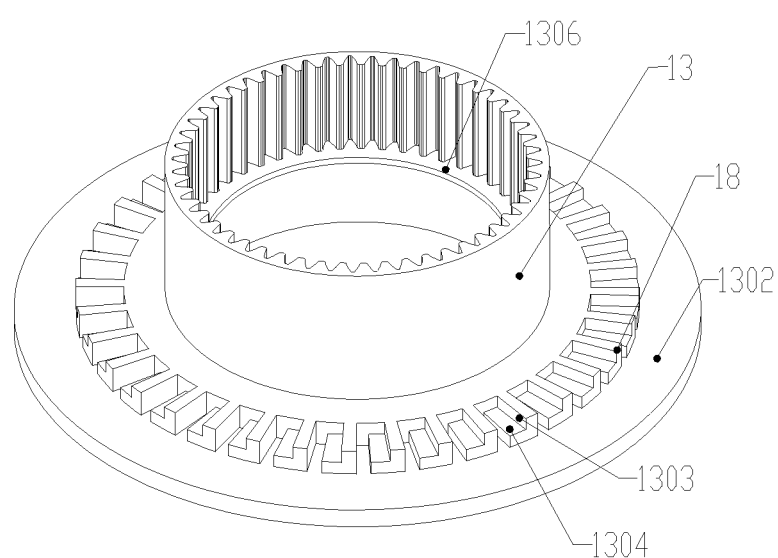
FIG. 9 is a structural schematic view of an inner gear ring in FIG. 1.
Figure 10:
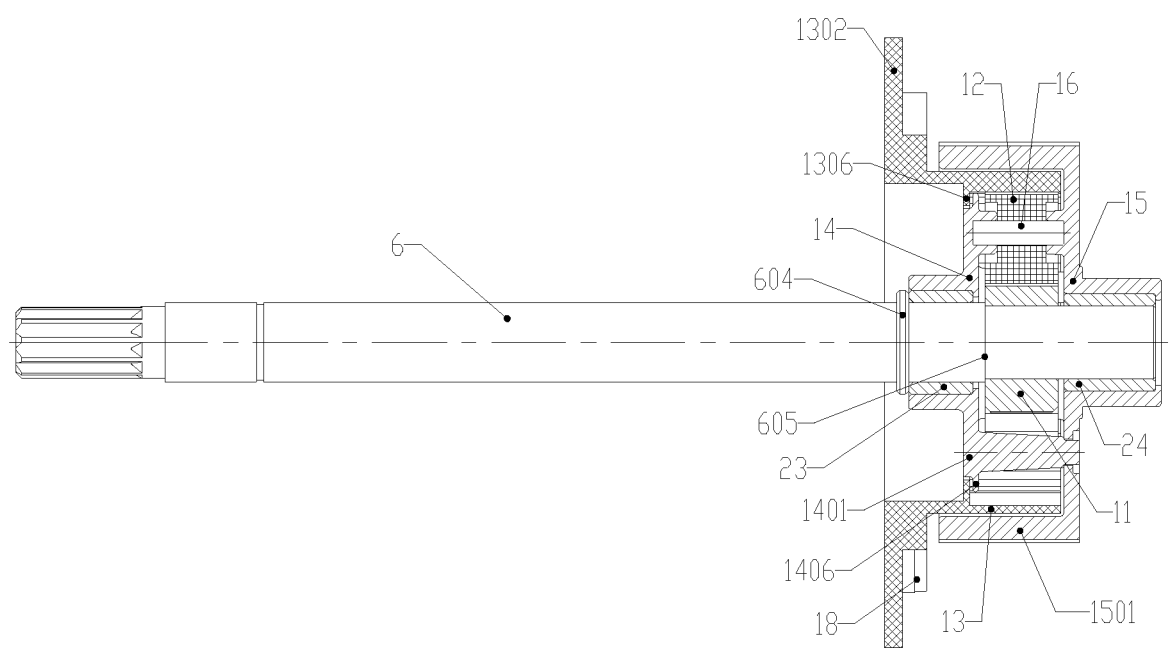
FIG. 10 is a structural schematic view of an assembling of the solid shaft and a speed reduction mechanism of FIG. 1.

Further, as shown in FIGS. 9 and 10, the outer ring of the planetary carrier 14 is integrally provided with a first oil retaining portion 1406 with an outward annular protrusion, the inner ring of the inner gear ring 13 is integrally provided with a second oil retaining portion 1306 with an inward annular protrusion, and the gap between the first oil retaining portion 1406 and the second oil retaining portion 1306 does not exceed 1 mm when the assembling is completed; and the second oil retaining portion 1306, the first oil retaining portion 1406, the body of the cover plate 15 of the planetary carrier and the body of the inner gear ring 13 form a labyrinth structure to prevent grease in the planetary gear train 29 from splashing during operation.

Figure 6:
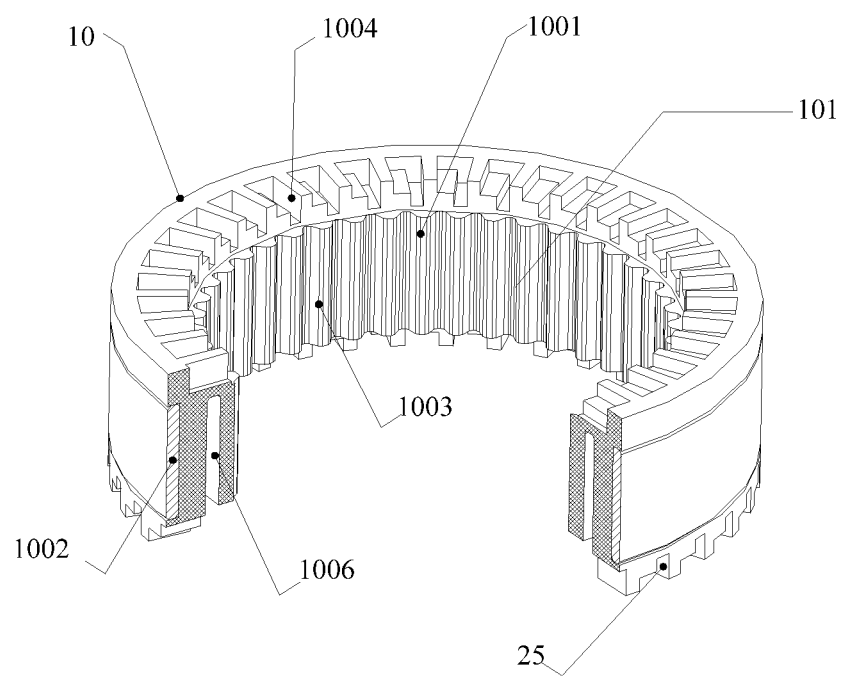
FIG. 6 is a structural schematic view of a clutch sliding sleeve of FIG. 1.

Further, as shown in FIG. 6, the clutch sliding sleeve 10 comprises a non-magnetic conductive tooth-shaped piece 1001 and a magnetic conductive sleeve 1002, the non-magnetic conductive tooth-shaped piece 1001 and the magnetic conductive sleeve 1002 are matched in diameter and integrally formed, and the magnetic conductive sleeve 1002 is arranged on the outer ring of the non-magnetic conductive tooth-shaped piece 1001; as shown in FIGS. 2, 6 and 8, the outer ring of the cover plate 15 of the planetary carrier is fixedly provided with a first spline portion 1504, and the clutch sliding sleeve 10 is axially and slidably sleeved outside the first spline portion 1504 of the cover plate 15 of the planetary carrier by a second spline portion 1003 fixedly arranged on an inner hole; two ends of the non-magnetic conductive tooth-shaped piece 1001 are respectively provided with first dewatering clutch teeth 1004 and first washing clutch teeth 1005; an annular flange plate 1302 is integrally arranged on an end face, facing away from a gear part, of the inner gear ring 13 is provided with an annular flange plate 1302, and a side, facing the planetary gear train 29, of the flange plate 1302 is fixedly provided with second dewatering clutch teeth 18 uniformly distributed along the circumferential direction; and second washing clutch teeth 17 are correspondingly fixedly arranged on the rear shell 7.

Alternatively, the second dewatering clutch teeth 18 may be integrally molded with the inner gear ring 13, and the second washing clutch teeth 17 may be integrally molded with the rear shell 7.

Further, as shown in FIGS. 1 and 2, the electromagnetic coil assembly 20 is fixedly connected coaxially with the rear shell 7 and disposed outside the clutch sliding sleeve 10 and inside the stator 8.

Further, as shown in FIG. 6, an annular spring mounting portion 1006 is provided between the second spline portion 1003 and the magnetic conductive sleeve 1002 with an opening to the direction of the washing clutch teeth.

Alternatively, as shown in FIGS. 1, 2 and 6, the clutch spring 33 is arranged between the spring mounting portion 1006 and the rear shell 7; when the drum washing machine is in a non-working state, the clutch sliding sleeve 10 is positioned at the dewatering station, and the first dewatering clutch teeth 1004 and the second dewatering clutch teeth 18 are in a meshing state; during washing, the electromagnetic coil assembly 20 is powered on, the magnetic conductive sleeve 1002 moves backwards under the action of electromagnetic force and compresses the clutch spring 33; at the moment, the first washing clutch teeth 1005 and the second washing clutch teeth 17 are meshed, the planetary carrier assembly 28 is braked, the planetary gear train 29 is converted into a fixed shaft gear train, and the sun gear 11 and the inner gear ring 13 output in an equal speed ratio; during dewatering, the electromagnetic coil assembly 20 is powered off, the clutch sliding sleeve 10 is reset under the action of the clutch spring 33, the washing clutch teeth are not meshed, and the first dewatering clutch teeth 1004 and the second dewatering clutch teeth 18 are meshed; at the moment, the planetary carrier assembly 28 is fixedly connected with the inner gear ring 13, and the whole planetary gear train 29 operates at the same speed.

According to the solution that the electromagnetic coil assembly 20 is powered on in the washing mode and the electromagnetic coil assembly 20 is powered off in the dewatering mode, when abnormal power failure occurs in the dewatering state, the washing clutch teeth on the rotating component and the washing clutch teeth on the fixed component will not be meshed due to rapid resetting of the clutch mechanism 19, so that noise, even teeth rattling and other destructive results are avoided, and the clutch teeth are prevented from being damaged when the dewatering power failure occurs, which improves the reliability of the clutch mechanism 19.

Optionally, a clutch spring 33 is arranged between the spring mounting portion 1006 and the rotor 9. When the washing machine is in a non-working state, the clutch sliding sleeve 10 is in the washing station, and the first washing clutch teeth 1005 and the second washing clutch teeth 17 are in a meshing state. During washing, the electromagnetic coil assembly 20 is powered off, the clutch sliding sleeve 10 is reset under the action of the clutch spring 33; at the moment, the first washing clutch teeth 1005 and the second washing clutch teeth 17 are meshed, the planetary carrier assembly 28 is braked, the planetary gear train 29 is converted into a fixed shaft gear train, and the sun gear 11 and the inner gear ring 13 output in a reverse equal speed ratio; during dewatering, the electromagnetic coil assembly 20 is powered on, the magnetic conductive sleeve 1002 moves forwards under the action of electromagnetic force and compresses the clutch spring 33, the washing clutch teeth are not meshed, the first dewatering clutch teeth 1004 and the second dewatering clutch teeth 18 are meshed; at the moment, the planetary carrier assembly 28 is fixedly connected with the inner gear ring 13, and the whole planetary gear train 29 operates at the same speed.

According to the solution that the electromagnetic coil assembly 20 is powered on in the dewatering state, and the electromagnetic coil assembly 20 is powered off in the washing state, the general washing time is far longer than the dewatering time, so that the clutch mechanism 19 does not need a driving force during the washing, has the advantages of saving electricity, reducing energy consumption and improving efficiency.

Optionally, all the clutch teeth are composed of first straight teeth 1303 and second straight teeth 1304, the projection of the clutch teeth in the axial direction is step-shaped, the step-shaped clutch teeth are easy to mesh, and the total teeth height is small, so that the clutch reliability and the compression axial height can be effectively controlled.

The rotor 9, the stator 8, the electromagnetic coil assembly 20, the clutch sliding sleeve 10 and the planetary gear train 29 of the assembled driving system are sequentially nested in the radial direction from outside to inside, and the whole structure is connected in parallel in the internal cavity formed by the front cover plate 4 and the rear shell 7, which greatly improves the utilization rate of the axial dimension.

Further, as shown in FIG. 1, an inner hole of the rear shell 7 is press-fitted with a fifth bushing 27, and the planetary carrier assembly 28 is pivotally installed in an inner hole of a fifth bushing 27 via a fourth bush mounting portion 1505 and axially confined to the annular protrusion 1506.

Optionally, the first to fifth bushings are selected from oil-containing bearing materials.

Specifically, as shown in FIG. 1, the first oil seal 31 is fixed at the front end of the front cover plate 4, an inner hole of the first oil seal 31 is provided with a first sealing lip 3101 abutting against a first oil seal connecting portion 502 positioned on the hollow shaft 5, and the outer ring of the first oil seal 31 is provided with a second sealing lip 3102 abutting against an inner hole of the outer barrel 1; and the outer ring of the second oil seal 32 is fixedly connected to the second oil seal mounting portion 505 of the hollow shaft 5 and provided inwards with a third sealing lip 3201 abutting against the second oil seal connecting portion 602 of the solid shaft 6.

Embodiment 2

Figure 11:
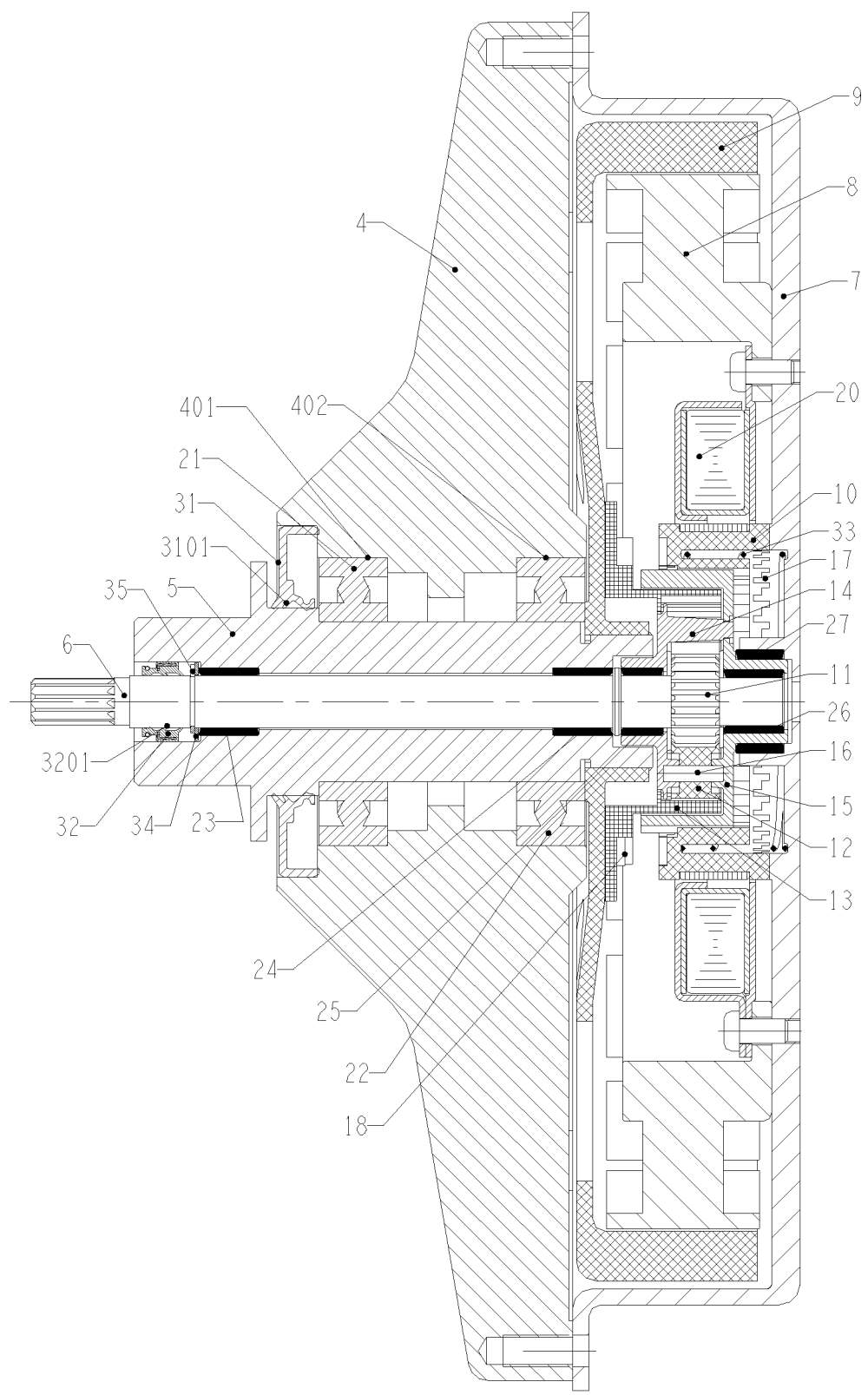
FIG. 11 is a cross-sectional structural schematic view of a driving system of a drum washing machine according to another embodiment of the present application.
Figure 12:
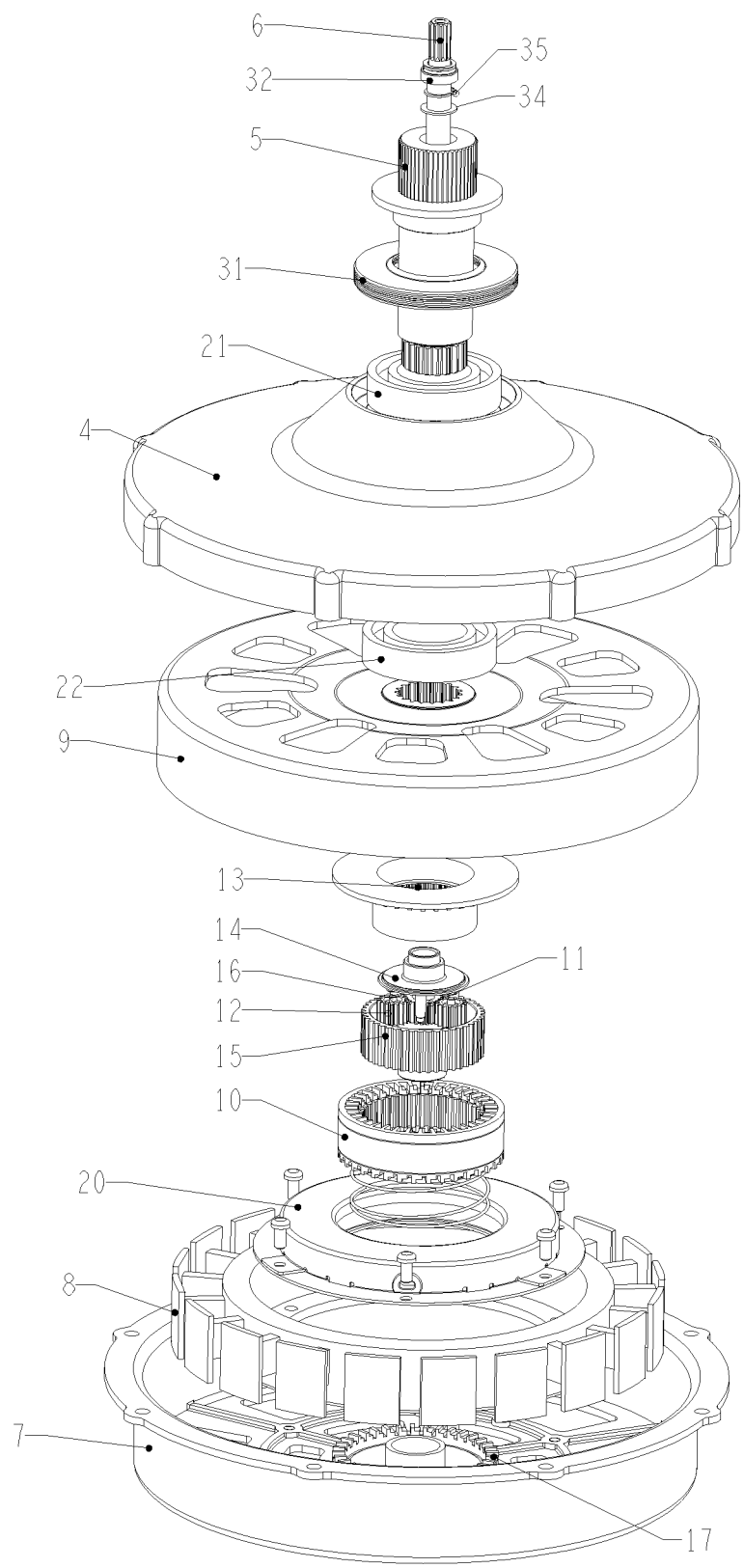
FIG. 12 is an exploded structural schematic view of the driving system of the drum washing machine shown in FIG. 11.
Figure 13:
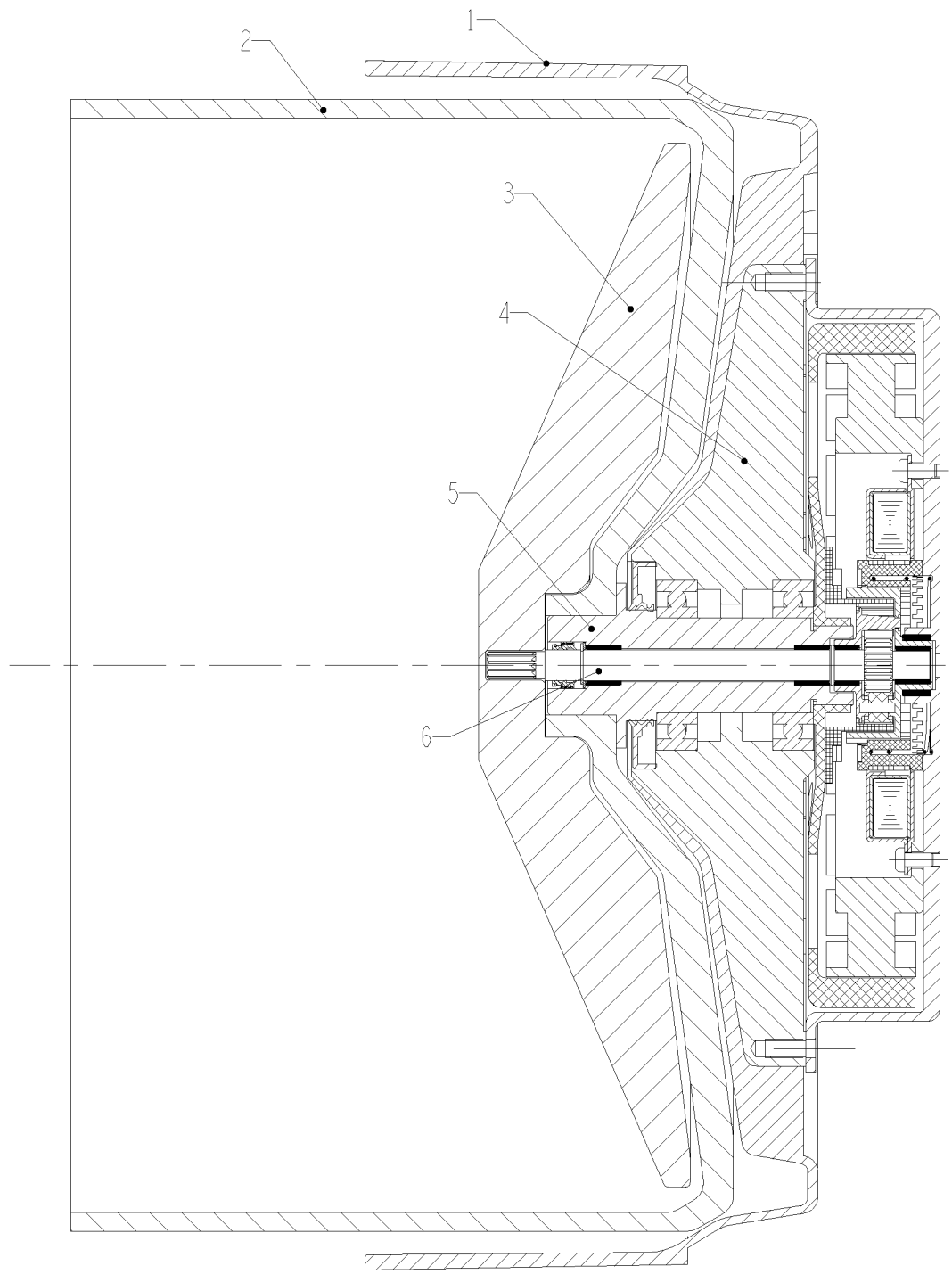
FIG. 13 is a partial cross-sectional structural schematic view of a drum washing machine according to another embodiment of the present application.

As shown in FIGS. 11, 12 and 13, the driving system of the drum washing machine comprises a mounting component, a transmission mechanism, a motor, a speed reduction mechanism 30, a clutch mechanism 19 and a seal.

The mounting component comprises a front cover plate 4 (which can also be called a cover plate support) and a rear shell 7, the front end and the rear end of an inner hole of the front cover plate 4 are respectively provided with a first bearing chamber 401 and a second bearing chamber 402, and outer rings of the first bearing 21 and the second bearing 22 are respectively fixedly installed in the first bearing chamber 401 and the second bearing chamber 402; and the rear shell 7 is fixedly connected to a rear end face of the front cover plate 4 in an opening-forward manner, with an internal cavity formed inside the both and used for accommodating other components, and no rotating component is arranged outside the whole driving system.

As shown in FIG. 13, the front cover plate 4 is integrally formed on the outer barrel 1 of the drum washing machine, that is, the front cover plate 4 is directly formed on the outer barrel 1 of the drum washing machine, so that the front cover plate 4 and the outer barrel 1 of the drum washing machine are integrally formed; and optionally, the front cover plate 4 is integrally molded onto the outer barrel 1 of the drum washing machine. Of course, the front cover plate 4 may be integrally formed on the outer barrel 1 of the drum washing machine in other manners.

The transmission component comprises a hollow shaft 5 and a solid shaft 6, and the hollow shaft 5 is rotatably installed in an inner hole of the front cover plate 4 by a first bearing 21 and a second bearing 22; the hollow shaft 5 is of a hollow structure, and the solid shaft 6 is rotatably arranged in the hollow shaft 5 by a first bushing 23 and a second bushing 24 which are press-fitted in an inner hole of the hollow shaft 5; a drum connecting portion 501 is arranged at the front end of the hollow shaft 5 and used for transmitting power to the drum 2; and the front end of the solid shaft 6 is provided with a rotating body connecting portion 601 for transmitting power to the rotating body 3.

The motor comprises a stator 8 and a rotor 9, optionally, the rotor 9 is fixedly connected to a rear end part of a hollow shaft 5 in an opening-backward manner, and the stator 8 is fixedly connected to a bottom of the rear shell 7 and coaxially arranged inside the rotor 9; and the entire motor is arranged in the internal cavity formed by the rear shell 7 and the front cover plate 4.

It should be noted that the above definition of the orientation of the front cover plate 4, the rear shell 7, the rotor 9, etc., with respect to the installation position of the entire driving system on the drum washing machine, is merely intended to illustrate the assembly positional relationship between the components and is not intended to limit the specific construction of the driving system.

The speed reduction mechanism 30 comprises a planetary carrier assembly 28 and a planetary gear train 29, wherein the planetary carrier assembly 28 comprises a planetary carrier 14 and a planetary carrier cover plate 15, the planetary gear train 29 comprises a sun gear 11, a plurality of planetary gears 12 and an inner gear ring 13, a plurality of planetary gear shafts 16 are circumferentially distributed between the planetary carrier 14 and the cover plate 15 of the planetary carrier, the planetary gears 12 hollowly sleeve the planetary gear shafts 16, and the planetary gears 12 are in one or more groups, with an outermost planetary gear 12 meshed outwards with the inner gear ring 13, and an innermost planetary gear 12 meshed with the sun gear 11; the planetary carrier 14 and the cover plate 15 of the planetary carrier are fixedly connected to form a planetary carrier assembly 28, the inner hole of the planetary carrier 14 and the inner hole of the cover plate 15 of the planetary carrier are fixedly provided with a third bushing 25 and a fourth bushing 26 respectively, and the third bushing 25 and the fourth bushing 26 rotatably hollowly sleeve the solid shaft 6; the solid shaft 6 is fixedly connected with a sun gear 11 positioned between the third bushing 25 and the fourth bushing 26 and being meshed outwards with the planetary gear 12 in a transmission manner; and the inner gear ring 13 is coaxially and fixedly arranged on the rotor 9, the cover plate 15 of the planetary carrier is of a cup-shaped structure, the planetary carrier 14 is arranged on an inner side of the cup-shaped structure, and the inner gear ring 13 is arranged between the outer ring of the planetary carrier 14 and the inner wall of the cover plate 15 of the planetary carrier and is meshed inwards with the planetary gear 12.

Alternatively, as shown in FIG. 12, the planetary gears 12 are in a group (a group of the planetary gears 12 may include a plurality of the planetary gears 12 with central axes located on the same circle), that is, a group of the planetary gears 12 are provided between the sun gear 11 and the inner gear ring 13, and the planetary gears 12 are meshed outwards with the inner gear ring 13 and are meshed inwards with the sun gear 11, so that the inner gear ring 13 and the sun gear 11 output in a reverse direction. That is, That is, the solid shaft 6 and the hollow shaft 5 achieve reverse differential operation, which means the rotating body 3 and the drum 2 implement reverse differential operation.

Optionally, two groups of mutually meshed planetary gears 12 are arranged between the sun gear 11 and the inner gear ring 13, the planetary gears 12 located on an outer side are meshed outwards with the inner gear ring 13, and the planetary gears 12 located on an inner side are meshed inwards with the sun gear 11, so that the inner gear ring 13 and the sun gear 11 output in the same direction. That is, the solid shaft 6 and the hollow shaft 5 achieve the same-direction differential operation, which means that the rotating body 3 and the drum 2 implement same-direction differential operation.

The clutch mechanism 19 comprises a clutch sliding sleeve 10, an electromagnetic coil assembly 20 and a clutch spring 33, wherein the electromagnetic coil assembly 20 is coaxially and fixedly connected with the rear shell 7; the clutch sliding sleeve 10 comprises a non-magnetic conductive tooth-shaped piece 1001 and a magnetic conductive sleeve 1002, wherein the non-magnetic conductive tooth-shaped piece 1001 and the magnetic conductive sleeve 1002 are matched in diameter and integrally formed; the outer ring of the cover plate 15 of the planetary carrier is fixedly provided with a first spline portion 1504, and the clutch sliding sleeve 10 is axially and slidably sleeved outside the first spline portion 1504 by a second spline portion 1003 fixedly arranged on an inner hole; the two ends of the clutch sliding sleeve 10 are respectively provided with first dewatering clutch teeth 1004 and first washing clutch teeth 1005, the inner gear ring 13 is fixedly provided with second dewatering clutch teeth 18, and the rear shell 7 is fixedly provided with second washing clutch teeth 17; and a spring mounting portion 1006 is provided on the clutch sliding sleeve 10.

The seal comprises a first oil seal 31 and a second oil seal 32, the first oil seal 31 is fixedly arranged at the front end of the front cover plate 4, and is connected inwards with the hollow shaft 5 in a sealing manner, and outwards with an inner hole wall of the front cover plate 4 in a sealing manner; and the second oil seal 32 is fixedly arranged in an inner hole at the front end of the hollow shaft 5 and is connected inwards with the solid shaft 6 in a sealing manner.

Figure 14:
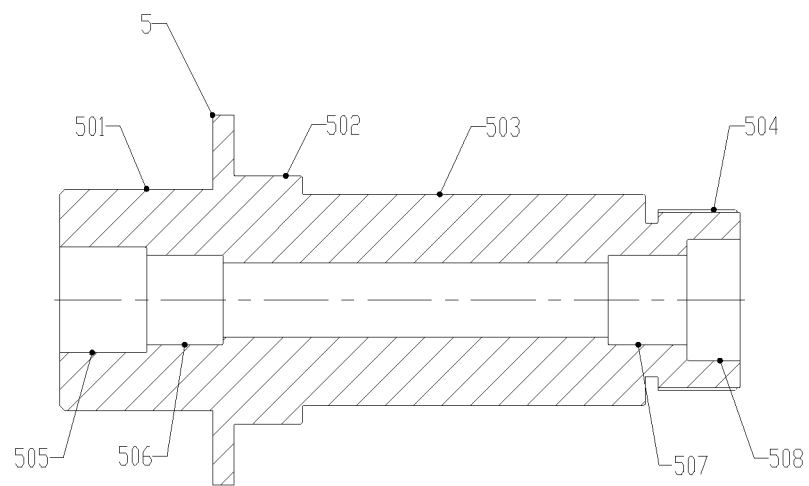
FIG. 14 is a structural schematic view of a hollow shaft of FIG. 11.

Specifically, as shown in FIG. 14, the hollow shaft 5 is of a hollow rotary structure, and a drum connecting portion 501, a first oil seal connecting portion 502, a bearing mounting portion 503 and a rotor connecting portion 504 are sequentially arranged outside the hollow shaft 5 from front to rear; an inner hole is sequentially provided with a second oil seal mounting portion 505, a first bushing mounting portion 506, a second bushing mounting portion 507 and a planetary carrier avoidance portion 508 from front to rear; during the assembling, the hollow shaft 5 is assembled into a bearing hole from the end of the first bearing 21, and the bearing mounting portion 503 is installed in the inner holes of the first bearing 21 and the second bearing 22 so as to be pivotally installed inside the front cover plate 4; and the front end of the hollow shaft 5 is fixedly connected with the drum 2 by the drum connecting portion 501, and the rear end is fixedly connected with the rotor 9 by the rotor connecting portion 504 extending out of the bearing hole.

Figure 15:
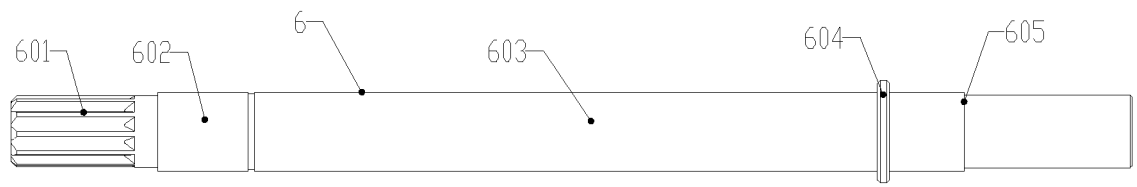
FIG. 15 is a structural schematic view of a solid shaft of FIG. 11.

Specifically, as shown in FIG. 15, the solid shaft 6 is sequentially provided with a rotating body connecting portion 601, a second oil seal connecting portion 602, a bushing mounting portion 603, a first shaft shoulder 604 and a second shaft shoulder 605 from front to rear, the solid shaft 6 is rotatably supported in an inner hole of the hollow shaft 5 by the first bushing 23 and the second bushing 24, and the solid shaft 6 is forwardly confined to the second bushing 24 by the first shaft shoulder 604; one side of the solid shaft 6 which penetrates out of the first bushing 23 is provided with an adjusting washer 34 for adjusting axial movement between the solid shaft 6 and the hollow shaft 5, and the adjusting washer 34 is confined backwards to the first bushing 23 by an elastic retaining ring 35 arranged at a front end of the adjusting washer 34; and the front end of the solid shaft 6 is fixedly connected with the rotating body 3 by the rotating body connecting portion 601, and the rear end of the solid shaft 6 is fixedly connected with the sun gear 11 and confined to the second shaft shoulder 605.

Alternatively, the solid shaft 6 and the sun gear 11 may be integrally machined as a gear shaft.

Further, as shown in FIGS. 11 and 13, the rotor 9 is fixedly connected at the rotor connecting portion 504 in an opening-backward manner and axially positioned on an inner ring end face of the second bearing 22; an inner gear ring 13 and a second dewatering clutch gear 18 are coaxially and fixedly connected to a bottom of an inner side of the rotor, and alternatively, the inner gear ring 13 and the second dewatering clutch gear 18 can be integrally molded on the rotor 9 or fixedly connected by assembling; the stator 8 is fixed at a bottom of the rear shell 7 by threaded connection, is coaxially arranged in the rotor 9, and the whole motor is arranged in a cavity formed by the rear shell 7 and the front cover plate 4; and the structure can improve the connection rigidity of the rotor 9 and the support rigidity of the whole system.

Figure 17:
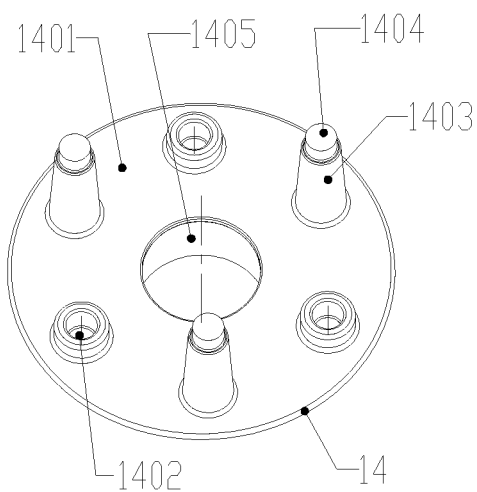
FIG. 17 is a structural schematic view of a planetary carrier of FIG. 11.

Further, as shown in FIGS. 11 and 13, the planetary carrier 14 and the cover plate 15 of the planetary carrier are of a hollow structure, with the inner holes of the planetary carrier 14 and the cover plate 15 of the planetary carrier fixedly provided with a third bushing 25 and a fourth bushing 26 respectively, and rotatably hollowly sleeve the solid shaft 6 by the bushing, and the sun gear 11 is arranged between the third bushing and the fourth bushing; as shown in FIGS. 11 and 17, the third bushing mounting portion 1405 integrally arranged on the planetary carrier 14 is inserted into the planetary carrier avoidance portion 508 of the hollow shaft 5 and axially confined on the first shaft shoulder 604; double-end support improves connection rigidity of the whole planetary gear train 29, avoids insufficient rigidity caused by single-side support, reduces washing noise and improves the stability of the whole planetary gear train 29; meanwhile, the arrangement of the planetary carrier avoidance portion compresses the axial dimension.

Further, as shown in FIGS. 12, 13, 17 and 18, the planetary carrier 14 and the cover plate 15 of the planetary carrier are fixedly connected as a planetary carrier assembly 28. Specifically, an inner side of a planetary carrier body 1401 is provided with a support column 1403, an end of the support column 1403 is provided with a boss 1404, the cover plate body 1501 is provided with a support column through hole 1503, the support column 1403 is inserted into the support column through hole 1503, and the boss 1404 is spin riveted, so that the planetary carrier 14 and the cover plate 15 of the planetary carrier are fixedly connected; a plurality of first mounting holes 1402 and second mounting holes 1502 are respectively and circumferentially distributed between the both, the first mounting holes 1402 and the second mounting holes 1502 are correspondingly arranged, a plurality of planetary gear shafts 16 are installed in the first mounting holes 1402 and the second mounting holes 1502, the planetary gears 12 hollowly sleeve the planetary gear shafts 16 and are meshed inwards with the sun gear 11 in a transmission manner; and the cover plate 15 of the planetary carrier is of a cup-shaped structure, the planetary carrier 14 is positioned inside the cup-shaped structure, and the inner gear ring 13 is coaxially arranged between the outer ring of the planetary carrier 14 and the inner wall of the cover plate 15 of the planetary carrier, and is meshed inwards with the planetary gear 12 in a transmission manner.

Figure 19:
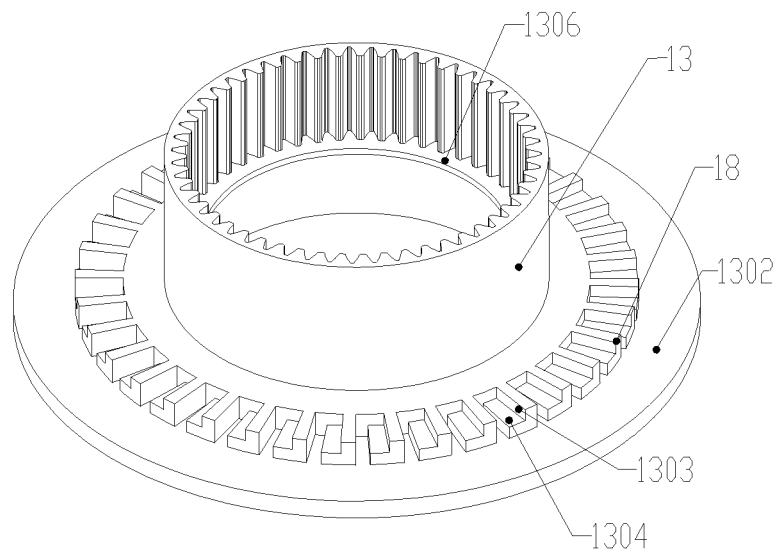
FIG. 19 is a structural schematic view of a ring gear in FIG. 11.
Figure 20:
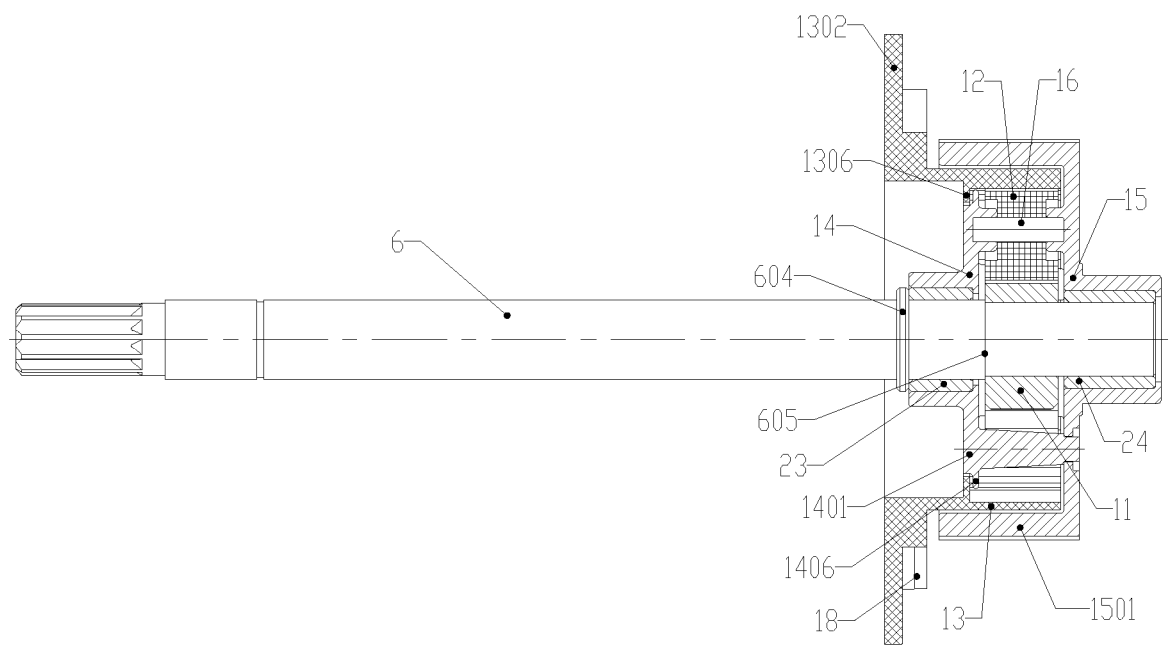
FIG. 20 is a structural schematic view of an assembling of the solid shaft and a speed reduction mechanism of FIG. 11.

Further, as shown in FIGS. 19 and 20, the outer ring of the planetary carrier 14 is integrally provided with a first oil retaining portion 1406 with an outward annular protrusion, the inner ring of the inner gear ring 13 is integrally provided with a second oil retaining portion 1306 with an inward annular protrusion, and the gap between the first oil retaining portion 1406 and the second oil retaining portion 1306 does not exceed 1 mm when the assembling is completed; and the second oil retaining portion 1306, the first oil retaining portion 1406, the body of the cover plate 15 of the planetary carrier and the body of the inner gear ring 13 form a labyrinth structure to prevent grease in the planetary gear train 29 from splashing during operation.

Figure 16:
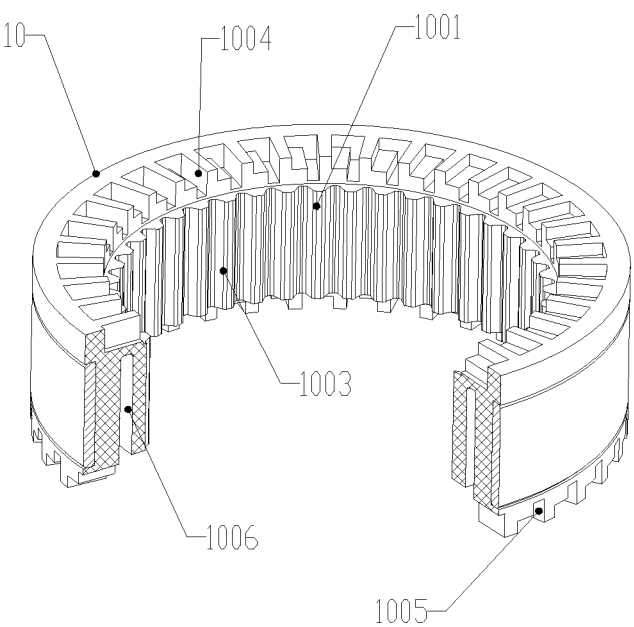
FIG. 16 is a structural schematic view of a clutch sliding sleeve of FIG. 11.
Figure 18:
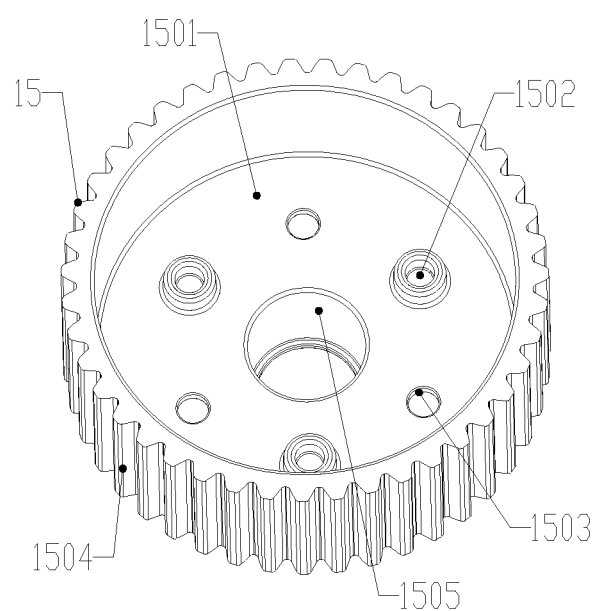
FIG. 18 is a structural schematic view of a cover plate of the planetary carrier of FIG. 11.

Further, as shown in FIG. 16, the clutch sliding sleeve 10 comprises a non-magnetic conductive tooth-shaped piece 1001 and a magnetic conductive sleeve 1002, the non-magnetic conductive tooth-shaped piece 1001 and the magnetic conductive sleeve 1002 are matched in diameter and integrally formed, and the magnetic conductive sleeve 1002 is arranged on the outer ring of the non-magnetic conductive tooth-shaped piece 1001; as shown in FIGS. 12, 16 and 18, the outer ring of the cover plate 15 of the planetary carrier is fixedly provided with a first spline portion 1504, and the clutch sliding sleeve 10 is axially and slidably sleeved outside the first spline portion 1504 of the cover plate 15 of the planetary carrier by a second spline portion 1003 fixedly arranged on an inner hole; two ends of the non-magnetic conductive tooth-shaped piece 1001 are respectively provided with first dewatering clutch teeth 1004 and first washing clutch teeth 1005; an annular flange plate 1302 is integrally arranged on an end face, facing away from a gear part, of the inner gear ring 13 is provided with an annular flange plate 1302, and a side, facing the planetary gear train 29, of the flange plate 1302 is fixedly provided with second dewatering clutch teeth 18 uniformly distributed along the circumferential direction; and second washing clutch teeth 17 are correspondingly fixedly arranged on the rear shell 7.

Alternatively, the second dewatering clutch teeth 18 may be integrally molded with the inner gear ring 13, and the second washing clutch teeth 17 may be integrally molded with the rear shell 7.

Further, as shown in FIGS. 11 and 12, the electromagnetic coil assembly 20 is fixedly connected coaxially with the rear shell 7 and disposed outside the clutch sliding sleeve 10 and inside the stator 8.

Further, as shown in FIG. 18, an annular spring mounting portion 1006 is provided between the second spline portion 1003 and the magnetic conductive sleeve 1002 with an opening to the direction of the washing clutch teeth.

Alternatively, as shown in FIGS. 11 and 12, the clutch spring 33 is arranged between the spring mounting portion 1006 and the rear shell 7; when the drum washing machine is in a non-working state, the clutch sliding sleeve 10 is positioned at the dewatering station, and the first dewatering clutch teeth 1004 and the second dewatering clutch teeth 18 are in a meshing state; during washing, the electromagnetic coil assembly 20 is powered on, the magnetic conductive sleeve 1002 moves backwards under the action of electromagnetic force and compresses the clutch spring 33; at the moment, the first washing clutch teeth 1005 and the second washing clutch teeth 17 are meshed, the planetary carrier assembly 28 is braked, the planetary gear train 29 is converted into a fixed shaft gear train, and the sun gear 11 and the inner gear ring 13 output in an equal speed ratio; during dewatering, the electromagnetic coil assembly 20 is powered off, the clutch sliding sleeve 10 is reset under the action of the clutch spring 33, the washing clutch teeth are not meshed, and the first dewatering clutch teeth 1004 and the second dewatering clutch teeth 18 are meshed; at the moment, the planetary carrier assembly 28 is fixedly connected with the inner gear ring 13, and the whole planetary gear train 29 operates at the same speed.

According to the solution that the electromagnetic coil assembly is powered on in the washing mode and the electromagnetic coil assembly is powered off in the dewatering mode, when abnormal power failure occurs in the dewatering state, the washing clutch teeth on the rotating component and the washing clutch teeth on the fixed component will not be meshed due to rapid resetting of the clutch mechanism 19, so that noise, even teeth rattling and other destructive results are avoided, and the clutch teeth are prevented from being damaged when the dewatering power failure occurs, which improves the reliability of the clutch mechanism 19.

Optionally, a clutch spring 33 is arranged between the spring mounting portion 1006 and the rotor 9; when the washing machine is in a non-working state, the clutch sliding sleeve 10 is positioned at a washing station, and the first washing clutch teeth 1005 and the second washing clutch teeth 17 are in a meshing state; during washing, the electromagnetic coil assembly 20 is powered off, the clutch sliding sleeve 10 is reset under the action of the clutch spring 33; at the moment, the first washing clutch teeth 1005 and the second washing clutch teeth 17 are meshed, the planetary carrier assembly 28 is braked, the planetary gear train 29 is converted into a fixed shaft gear train, and the sun gear 11 and the inner gear ring 13 output in a reverse equal speed ratio; during dewatering, the electromagnetic coil assembly 20 is powered on, the magnetic conductive sleeve 1002 moves forwards under the action of electromagnetic force and compresses the clutch spring 33, the washing clutch teeth are not meshed, the first dewatering clutch teeth 1004 and the second dewatering clutch teeth 18 are meshed; at the moment, the planetary carrier assembly 28 is fixedly connected with the inner gear ring 13, and the whole planetary gear train 29 operates at the same speed.

According to the solution that the electromagnetic coil assembly is powered on in the dewatering state, and the electromagnetic coil assembly is powered off in the washing state, the general washing time is far longer than the dewatering time, so that the clutch mechanism 19 does not need a driving force during the washing, has the advantages of saving electricity, reducing energy consumption and improving efficiency.

Optionally, all the clutch teeth are composed of first straight teeth 1303 and second straight teeth 1304, the projection of the clutch teeth in the axial direction is step-shaped, the step-shaped clutch teeth are easy to mesh, and the total teeth height is small, so that the clutch reliability and the compression axial height can be effectively controlled.

The rotor 9, the stator 8, the electromagnetic coil assembly 20, the clutch sliding sleeve 10 and the planetary gear train 29 of the assembled driving system are sequentially nested in the radial direction from outside to inside, and the whole structure is connected in parallel in the internal cavity formed by the front cover plate 4 and the rear shell 7, which greatly improves the utilization rate of the axial dimension.

Further, as shown in FIG. 11, an inner hole of the rear shell 7 is press-fitted with a fifth bushing 27, and the planetary carrier assembly 28 is pivotally installed in an inner hole of a fifth bushing 27 via a fourth bush mounting portion 1505 and axially confined to the annular protrusion 1506.

Optionally, the first to fifth bushings are selected from oil-containing bearing materials.

Specifically, as shown in FIG. 11, the first oil seal 31 is fixed at the front end of the front cover plate 4, and an inner hole of the first oil seal 31 is provided with a first sealing lip 3101 abutting against a first oil seal connecting portion 502 positioned on the hollow shaft 5; and the outer ring of the second oil seal 32 is fixedly connected to the second oil seal mounting portion 505 of the hollow shaft 5 and provided inwards with a third sealing lip 3201 abutting against the second oil seal connecting portion 602 of the solid shaft 6. Compared with Embodiment 1, this embodiment eliminates the second sealing lip 3102 provided on the outer ring of the first oil seal 31 for outward sealing connection with the outer barrel 1 of the drum washing machine.

Some embodiments of the second aspect of the present application provide a drum washing machine, as shown in FIG. 3, comprising an outer barrel 1, a drum 2, a rotating body 3 and a driving system of the drum washing machine of any of the above embodiments, wherein the outer barrel 1 is supported on a base of the drum washing machine by a suspension system, the drum 2 is arranged inside the outer barrel 1, and the rotating body 3 is arranged at a bottom of the drum 2; the driving system is fixed on a rear end face of the outer barrel 1 by threaded connection, namely, the front cover plate 4, the rear shell 7 and the outer barrel 1 of the driving system are all independent components, and the three are fixedly connected by fasteners such as threaded screws; and the hollow shaft 5 and the solid shaft 6 extend into the interior of the drum washing machine through an opening at a bottom of the outer barrel 1, the hollow shaft 5 is fixedly connected with the drum 2, and the solid shaft 6 is fixedly connected with the rotating body 3.

Other embodiments of the second aspect of the present application provide a drum washing machine, as shown in FIG. 13, comprising an outer barrel 1, a drum 2, a rotating body 3 and a driving system of the drum washing machine of any one of the above embodiments, wherein the outer barrel 1 is supported on a base of the drum washing machine through a suspension system, the drum 2 is arranged inside the outer barrel 1, and the rotating body 3 is arranged at a bottom of the drum 2; the front cover plate 4 is integrally molded on the outer barrel 1, and the whole driving system is installed on the outer barrel 1 by the front cover plate 4; and the hollow shaft 5 and the solid shaft 6 extend into the interior of the drum washing machine through an opening at a bottom of the outer barrel 1, the hollow shaft 5 is fixedly connected with the drum 2, and the solid shaft 6 is fixedly connected with the rotating body 3.

When the planetary carrier assembly 28 is fixedly connected with the stator 8 by the clutch mechanism 19, the sun gear 11 and the inner gear ring 13 drive the rotating body 3 and the drum 2 to operate at a differential speed by the hollow shaft 5 and the solid shaft 6 respectively, so that dual output is realized; and when the clutch mechanism 19 fixedly connects the inner gear ring 13 and the planetary carrier assembly 28, the entire planetary gear train 29 operates at the same speed, and the rotating body 3 and the drum 2 operate at the same speed.

The purpose of switching the single-output or dual-output washing mode is achieved by controlling whether the rotating body 3 and the drum 2 are in a differential operation state during washing.

In particular, the dual output mode is that under the washing working condition, the motor operates at a low rotating speed, the clutch mechanism 19 enables the planetary carrier assembly 28 to be fixedly connected with the stator 8, the drum 2 operates at the same speed as the motor, and the rotating body 3 operates at the same speed ratio with the drum 2 by the speed increase of the planetary gear train 29; and at the moment, the drum washing machine is in a dual-output washing state, has strong washing capability, and can wash stubborn stains or clothes made of washing-resistant materials; and under the dewatering working condition, the motor operates at a high speed, the clutch mechanism 19 enables the inner gear ring 13 to be fixedly connected with the planetary carrier assembly 28, and the rotating body 3, the drum 2 and the motor operate at a same high speed.

In particular, the single output mode is that under a washing working condition, the motor operates at a low rotating speed, the clutch mechanism 19 enables the inner gear ring 13 to be fixedly connected with the planetary carrier assembly 28, and the rotating body 3, the drum 2 and the motor operate at a same low speed; at the moment, the drum washing machine is in a single-output washing state, so that the drum washing machine has the advantages of not damaging clothes, and can wash the clothes required to be washed gently, such as cashmere or silk; under the dewatering working condition, the motor operates at a high speed, the clutch mechanism 19 enables the inner gear ring 13 to be fixedly connected with the planetary carrier assembly 28, the rotating body 3, the drum 2 and the motor operate at a same high speed, and the clutch mechanism 19 does not perform station switching at the moment, which can be realized by an electric control program.

In particular, the single output mode is that under a washing working condition, the motor operates at a low rotating speed, the clutch mechanism 19 enables the inner gear ring 13 to be fixedly connected with the planetary carrier assembly 28, and the rotating body 3, the drum 2 and the motor operate at a same low speed; at the moment, the drum washing machine is in a single-output washing state, so that the drum washing machine has the advantages of not damaging clothes, and can wash the clothes required to be washed gently, such as cashmere or silk; under the dewatering working condition, the motor operates at a high speed, the clutch mechanism 19 enables the inner gear ring 13 to be fixedly connected with the planetary carrier assembly 28, the rotating body 3, the drum 2 and the motor operate at a same high speed, and the clutch mechanism 19 does not perform station switching at the moment, which can be realized by an electric control program.

Although having the appended claims, this application is also defined by the following clauses.

1. A driving system of a drum washing machine, comprising: a front cover plate integrally molded into an outer barrel of the drum washing machine; a hollow shaft rotatably installed in an inner hole of a front cover plate, and a drum shaft rotatably arranged in the hollow shaft; a motor comprising a stator and a rotor, wherein the rotor is fixedly connected to the rear end of the hollow shaft in a opening-backward manner; a clutch mechanism being controlled to be selectively engaged to one of the stator and the rotor in a transmission manner; a speed reduction mechanism comprising a planetary carrier assembly engaged to the clutch mechanism, and a planetary gear train connected between the solid shaft and the rotor in a transmission manner; wherein the clutch mechanism is engaged to the stator in a transmission manner, the planetary carrier assembly is fixedly connected with the stator, and the rotor drives the solid shaft and the hollow shaft to operate at a differential speed by the planetary gear train; and the clutch mechanism is engaged to the rotor in a transmission manner, the planetary carrier assembly is fixedly connected to the rotor, and the rotor drives the solid shaft and the hollow shaft to operate at a same speed by the planetary gear train.

2. The driving system of the drum washing machine according to clause 1, wherein the planetary carrier assembly hollowly sleeves the solid shaft rotatably, the planetary carrier assembly comprises a planetary carrier and a cover plate of the planetary carrier, the cover plate of the planetary carrier is of a cup-shaped structure, the planetary carrier is placed at an inner side of the cup-shaped structure and fixedly connected with the cover plate of the planetary carrier, and the planetary gear train is arranged inside the cover plate of the planetary carrier; and a first spline portion is fixedly arranged on an outer ring of the cover plate of the planetary carrier, and the clutch mechanism is sleeved outside the first spline portion.

3. The driving system of the drum washing machine according to clause 2, wherein the planetary gear train comprises a sun gear, planetary gears and an inner gear ring, the inner gear ring is coaxially and fixedly arranged on the rotor, the sun gear is fixedly arranged on the solid shaft, and one or more groups of the planetary gears are arranged between the sun gear and the inner gear ring in a meshing transmission mode; wherein a planetary gear shaft is arranged between a bottom of an inner side of the cover plate of the planetary carrier and the planetary carrier, the planetary gears hollowly sleeve the planetary gear shaft and is meshed inwards with the sun gear, and the inner gear ring is arranged between the outer ring of the planetary carrier and the inner wall of the cover plate of the planetary carrier and is meshed inwards with the planetary gear.

4. The driving system of the drum washing machine according to clause 3, wherein a third bushing is fixedly arranged in an inner hole of the planetary carrier, a fourth bushing is fixedly arranged in the inner hole of the cover plate of the planetary carrier, the planetary carrier assembly hollowly sleeves the solid shaft rotatably by the third bushing and the fourth bushing, and the sun gear is positioned between the third bushing and the fourth bushing.

5. The driving system of the drum washing machine according to the clause 3, a group of the planetary gears are arranged between the sun gear and the inner gear ring, and the planetary gears are meshed outwards with the inner gear ring and meshed inwards with the sun gear, so that the inner gear ring and the sun gear output in a reverse direction; or two groups of the planetary gears meshed with each other are arranged between the sun gear and the inner gear ring, the planetary gears positioned on an outer side are meshed outwards with the inner gear ring, and the planetary gears positioned on an inner side are meshed inwards with the sun gear, so that the inner gear ring and the sun gear output in a same direction.

6. The driving system of the drum washing machine according to clause 3, wherein the clutch mechanism comprises a clutch sliding sleeve, a second spline portion is fixedly arranged on an inner hole of the clutch sliding sleeve, and the clutch sliding sleeve is axially and slidably sleeved outside the first spline portion by the second spline portion; and two ends of the clutch sliding sleeve are respectively provided with first dewatering clutch teeth and first washing clutch teeth, the inner gear ring is fixedly provided with second dewatering clutch teeth, the stator is fixedly connected with second washing clutch teeth, and the clutch sliding sleeve can be controlled to slide towards one of the second dewatering clutch teeth and the second washing clutch teeth.

7. The driving system of the drum washing machine according to clause 6, wherein the clutch mechanism further comprises an electromagnetic coil assembly and a clutch spring, the clutch sliding sleeve comprises a non-magnetic conductive tooth-shaped piece and a magnetic conductive sleeve sleeved on the non-magnetic conductive tooth-shaped piece, and the clutch sliding sleeve can switchably slide between a dewatering station and a washing station under the action of an electromagnetic force of the electromagnetic coil assembly and an elastic force of the clutch spring.

8. The driving system of the drum washing machine according to clause 7, comprising a rear shell fixedly connected to the rear end face of the front cover plate in an opening-forward manner and hollowly sleeved outside the rotor without contact, wherein the stator is fixedly connected to a bottom of the rear shell and is coaxially arranged inside or outside the rotor, and the second washing clutch teeth is fixedly arranged on the rear shell; and the electromagnetic coil assembly is fixedly connected with the rear shell and coaxially arranged inside the stator, and the electromagnetic coil assembly is sleeved outside the clutch sliding sleeve.

9. The driving system of the drum washing machine according to clause 8, wherein the clutch sliding sleeve is provided with a spring mounting portion with a backward opening, and the clutch spring is arranged between the spring mounting portion and the rear shell, so that the clutch sliding sleeve slides towards the second washing clutch teeth when the electromagnetic coil assembly is powered on, and the clutch sliding sleeve slides towards the second dewatering clutch teeth when the electromagnetic coil assembly is powered off.

10. The driving system of the drum washing machine according to clause 8, wherein the clutch sliding sleeve is provided with a spring mounting portion with a frontward opening, and the clutch spring is arranged between the spring mounting portion and the rotor, so that the clutch sliding sleeve slides towards the second dewatering clutch teeth when the electromagnetic coil assembly is powered on, and the clutch sliding sleeve slides towards the second washing clutch teeth when the electromagnetic coil assembly is powered off.

11. The driving system of the drum washing machine according to clause 8, wherein an inner hole is formed in one side of the rear shell facing the front cover plate, a fifth bushing is press-fitted in an inner hole of the rear shell, and the planetary carrier assembly is pivotally installed in the inner hole of the fifth bushing.

12. The driving system of the drum washing machine according to any one of clauses 1 to 11, wherein the front end and the rear end of an inner hole of the front cover plate are respectively provided with a first bearing and a second bearing, and the hollow shaft is rotatably installed in an inner hole of the front cover plate by the first bearing and the second bearing; and the hollow shaft is of a hollow structure, and the solid shaft is rotatably arranged in the hollow shaft by a first bushing and a second bushing which are press-fitted in an inner hole of the hollow shaft.

13. The driving system of the drum washing machine according to clause 12, comprising: a first oil seal fixedly installed at the front end of the front cover plate and connected inwards with the hollow shaft in a sealing manner; and a second oil seal fixedly installed in an inner hole at the front end of the hollow shaft and connected with inwards the solid shaft in a sealing manner.

14. The driving system of the drum washing machine according to any one of clauses 1 to 7, comprising: a rear shell fixedly connected to the rear end face of the front cover plate in an opening-forward manner and fixedly connected with the front cover plate to form an internal cavity, and the motor, the clutch mechanism and the speed reduction mechanism are all placed in the internal cavity.

15. A drum washing machine, comprising: an outer barrel, a drum positioned inside the outer barrel and a rotating body arranged at a bottom of the drum; and a driving system of the drum washing machine according to any one of clauses 1 to 14, wherein a front cover plate of the driving system is integrally molded on the outer barrel, a hollow shaft and a solid shaft of the driving system extend into the drum through an opening at a bottom of the outer barrel, the hollow shaft is fixedly connected with the drum, and the solid shaft is fixedly connected with the rotating body.

16. The drum washing machine according to clause 15, comprising a controller electrically connected with a clutch mechanism and used for controlling the clutch mechanism to be engaged with one of a stator and a rotor in a transmission manner in a washing stage according to an acquired washing mode instruction.

The above descriptions are only preferred embodiments of this application, and are not intended to limit this application. For those skilled in the art, this application can have various modifications and changes. Any modifications, equivalents, improvements, etc. that come within the spirit and principles of this application are intended to be included within the scope of this application.

What is claimed is:
1. A driving system of a drum washing machine, the driving system comprising:
a hollow shaft and a solid shaft rotatably arranged in the hollow shaft;
a motor comprising a stator and a rotor, wherein the rotor is fixedly connected to one end of the hollow shaft;
a clutch mechanism configured to be controlled to be selectively engaged to one of the stator and the rotor in a transmission manner; and
a speed reduction mechanism comprising:
a planetary carrier assembly engaged to the clutch mechanism; and
a planetary gear train connected between the solid shaft and the rotor in a transmission manner,
wherein in a configuration where the clutch mechanism is engaged to the stator in the transmission manner, the planetary carrier assembly is fixedly connected with the stator, and the rotor drives the solid shaft and the hollow shaft to operate at a differential speed by the planetary gear train, and
wherein in a configuration where the clutch mechanism is engaged to the rotor in the transmission manner, the planetary carrier assembly is fixedly connected with the rotor, and the rotor drives the solid shaft and the hollow shaft to operate at a same speed by the planetary gear train.

2. The driving system according to claim 1,
wherein the rotor is fixedly connected to a rear end of the hollow shaft,
wherein a rotor cavity of the rotor is oriented in a rearward direction, and
wherein the stator is coaxially arranged inside or outside the rotor.

3. The driving system according to claim 2, comprising:
a front cover plate provided with an inner hole, wherein the hollow shaft is rotatably installed in the inner hole of the front cover plate; and
a rear shell fixedly connected to a rear end face of the front cover plate with a rear shell cavity of the rear shell oriented in a forward direction and hollowly sleeved outside the rotor without contact,
wherein the stator is fixedly connected to a bottom of an inner side of the rear shell.

4. The driving system according to claim 3,
wherein the rear shell and the front cover plate are fixedly connected to form an internal cavity, and the motor, the speed reduction mechanism and the clutch mechanism are arranged in the internal cavity.

5. The driving system according to claim 3,
wherein a front end and a rear end of the inner hole of the front cover plate are respectively provided with a first bearing and a second bearing, and the hollow shaft is rotatably arranged in the inner hole of the front cover plate by the first bearing and the second bearing, and
wherein the hollow shaft is of a hollow structure, and the solid shaft is rotatably arranged in the hollow shaft by a first bushing and a second bushing which are press-fitted in an inner hole of the hollow shaft.

6. The driving system according to claim 5,
wherein the front cover plate is an independent component independent of an outer barrel of the drum washing machine, and
wherein the driving system comprises:
  a first oil seal fixedly installed at a front end of the front cover plate, connected inwards with the hollow shaft in a sealing manner, and connected outwardly with the outer barrel of the drum washing machine in a sealing manner; and
  a second oil seal fixedly installed in an inner hole at a front end of the hollow shaft and connected inwardly with the solid shaft in a sealing manner.

7. The driving system according to claim 5,
wherein the front cover plate is integrally formed on an outer barrel of the drum washing machine, and
wherein the driving system comprises:
  a first oil seal fixedly installed at the front end of the front cover plate and connected inwardly with the hollow shaft in a sealing manner; and
  a second oil seal fixedly installed in the inner hole at the front end of the hollow shaft and connected inwardly with the solid shaft in a sealing manner.

8. The driving system according to claim 1,
wherein the planetary carrier assembly rotatably and hollowly sleeves the solid shaft,
wherein the planetary carrier assembly comprises a planetary carrier and a cover plate of the planetary carrier,
wherein the cover plate of the planetary carrier comprises a planetary carrier cover plate cavity,
wherein the planetary carrier is placed within the planetary carrier cover plate cavity and fixedly connected with the cover plate of the planetary carrier, and the planetary gear train is arranged inside the cover plate of the planetary carrier, and
wherein a first spline portion is fixedly arranged on an outer ring of the cover plate of the planetary carrier, and the clutch mechanism is sleeved outside the first spline portion.

9. The driving system according to claim 8,
wherein the planetary gear train comprises a sun gear, planetary gears and an inner gear ring, the inner gear ring is coaxially and fixedly arranged on the rotor, the sun gear is fixedly arranged on the solid shaft, and one or more groups of the planetary gears are arranged between the sun gear and the inner gear ring in a meshing transmission manner,
wherein the driving system comprises a planetary gear shaft arranged between a bottom of an inner side of the cover plate of the planetary carrier and the planetary carrier,
wherein the planetary gears hollowly sleeve the planetary gear shaft and is meshed inwards with the sun gear, and the inner gear ring is arranged between the outer ring of the
planetary carrier and an inner wall of the cover plate of the planetary carrier and is meshed inwards with the planetary gear.

10. The driving system according to claim 9, comprising
a third bushing fixedly arranged in an inner hole of the planetary carrier; and
a fourth bushing fixedly arranged in an inner hole of the cover plate of the planetary carrier,
wherein the planetary carrier assembly rotatably and hollowly sleeves the solid shaft by the third bushing and the fourth bushing, and the sun gear is positioned between the third bushing and the fourth bushing.

11. The driving system according to claim 9,
wherein in a configuration where a group of the planetary gears are arranged between the sun gear and the inner gear ring, and the planetary gears are meshed outwards with the inner gear ring and meshed inwards with the sun gear, the inner gear ring and the sun gear output in a reverse direction, and
wherein in a configuration where two groups of the planetary gears meshed with each other are arranged between the sun gear and the inner gear ring, the planetary gears positioned on an outer side are meshed outwards with the inner gear ring, and the planetary gears on an inner side are meshed inwards with the sun gear, the inner gear ring and the sun gear output in a same direction.

12. The driving system according to claim 9,
wherein the clutch mechanism comprises a clutch sliding sleeve, a second spline portion is fixedly arranged on an inner hole of the clutch sliding sleeve, and the clutch sliding sleeve is axially and slidably sleeved outside the first spline portion by the second spline portion, and
wherein two ends of the clutch sliding sleeve are respectively provided with first dewatering clutch teeth and first washing clutch teeth, the inner gear ring is fixedly provided with second dewatering clutch teeth, the stator is fixedly connected with second washing clutch teeth, and the clutch sliding sleeve can be controlled to slide towards one of the second dewatering clutch teeth and the second washing clutch teeth.

13. The driving system according to claim 12,
wherein the clutch mechanism further comprises an electromagnetic coil assembly and a clutch spring, the clutch sliding sleeve comprises a non-magnetic conductive tooth-shaped piece and a magnetic conductive sleeve sleeved on the non-magnetic conductive tooth-shaped piece, and the clutch sliding sleeve is configured to switchably slide between a dewatering station and a washing station under an action of an electromagnetic force of the electromagnetic coil assembly and an elastic force of the clutch spring.

14. The driving system according to claim 13,
wherein the driving system comprises a front cover plate and a rear shell,
wherein the rear shell is fixedly connected to a rear end face of the front cover plate with a rear shell cavity of the rear shell oriented in a forward direction and hollowly sleeved outside the rotor without contact,
wherein the stator is fixedly connected to a bottom of an inner side of the rear shell and is coaxially arranged inside the rotor,
wherein the second washing clutch teeth are fixed to a bottom of an inner side of the rear shell, and
wherein the electromagnetic coil assembly is fixedly connected with the rear shell and coaxially arranged inside the stator, and the electromagnetic coil assembly is sleeved outside the clutch sliding sleeve.

15. The driving system according to claim 14,
wherein the clutch sliding sleeve is provided with a spring mounting portion comprising a spring mounting portion cavity oriented in a rearward direction, and the clutch spring is arranged between the spring mounting portion and the rear shell, so that the clutch sliding sleeve slides towards the second washing clutch teeth when the electromagnetic coil assembly is powered on, and the clutch sliding sleeve slides towards the second dewatering clutch teeth when the electromagnetic coil assembly is powered off.

16. The driving system according to claim 14,
wherein the clutch sliding sleeve is provided with a spring mounting portion comprising a spring mounting portion cavity oriented in a frontward direction, and the clutch spring is arranged between the spring mounting portion and the rotor, so that the clutch sliding sleeve slides towards the second dewatering clutch teeth when the electromagnetic coil assembly is powered on, and the clutch sliding sleeve slides towards the second washing clutch teeth when the electromagnetic coil assembly is powered off.

17. The driving system according to claim 3,
wherein an inner hole is formed in one side of the rear shell facing the front cover plate, a fifth bushing is press-fitted in the inner hole of the rear shell, and the planetary carrier assembly is pivotally installed in an inner hole of the fifth bushing.

18. A drum washing machine comprising:
an outer barrel, a drum positioned inside the outer barrel and a rotating body arranged at a bottom of the drum; and
a driving system comprising:
  a hollow shaft and a solid shaft rotatably arranged in the hollow shaft;
  a motor comprising a stator and a rotor, wherein the rotor is fixedly connected to one end of the hollow shaft;
  a clutch mechanism configured to be controlled to be selectively engaged to one of the stator and the rotor in a transmission manner; and
  a speed reduction mechanism comprising:
    a planetary carrier assembly engaged to the clutch mechanism; and
    a planetary gear train connected between the solid shaft and the rotor in a transmission manner,
  wherein in a configuration where the clutch mechanism is engaged to the stator in the transmission manner, the planetary carrier assembly is fixedly connected with the stator, and the rotor drives the solid shaft and the hollow shaft to operate at a differential speed by the planetary gear train,
  wherein in a configuration where the clutch mechanism is engaged to the rotor in the transmission manner, the planetary carrier assembly is fixedly connected with the rotor, and the rotor drives the solid shaft and the hollow shaft to operate at a same speed by the planetary gear train, and
  wherein the driving system is fixedly connected to a rear end face of the outer barrel, the hollow shaft and the solid shaft extend into the drum by an opening at a bottom of the outer barrel, the hollow shaft is fixedly connected with the drum, and the solid shaft is fixedly connected with the rotating body.

19. The drum washing machine according to claim 18,
wherein the driving system comprises a front cover plate and a rear shell, the front cover plate and the rear shell are independent components independent of the outer barrel, and the three are fixedly connected by fasteners, or
wherein the driving system comprises a front cover plate and a rear shell, wherein the front cover plate is integrally formed on the outer barrel, and the rear shell is fixedly connected with the front cover plate by a fastener.

20. The drum washing machine according to claim 18, comprising:
a controller electrically connected with the clutch mechanism and configured to control the clutch mechanism to be engaged with one of the stator and the rotor in the transmission manner in a washing stage according to an acquired washing mode instruction.

* * * * *